US007927207B2

(12) United States Patent
Okada

(10) Patent No.: US 7,927,207 B2
(45) Date of Patent: Apr. 19, 2011

(54) GAME MACHINE HAVING A SHUTTER CONTROL FOR BLOCKING VARIABLE DISPLAYS ACCORDING TO A STOP CONTROL SELECTION HAVING A STOPPING ORDER

(75) Inventor: Kazuo Okada, Tokyo (JP)

(73) Assignee: Aruze Corp., Tokyo (JP)

( * ) Notice: Subject to any disclaimer, the term of this patent is extended or adjusted under 35 U.S.C. 154(b) by 0 days.

(21) Appl. No.: 12/183,582

(22) Filed: Jul. 31, 2008

(65) Prior Publication Data

US 2008/0311977 A1 Dec. 18, 2008

Related U.S. Application Data

(63) Continuation of application No. 10/644,955, filed on Aug. 21, 2003, now abandoned.

(30) Foreign Application Priority Data

Aug. 21, 2002 (JP) ................................. 2002-240704

(51) Int. Cl.
*G06F 17/00* (2006.01)
*G06F 19/00* (2006.01)

(52) U.S. Cl. ................ 463/20; 463/16; 463/30; 463/31; 273/138.1

(58) Field of Classification Search ........................ None
See application file for complete search history.

(56) References Cited

U.S. PATENT DOCUMENTS 3,642,287 A 2/1972 Lally et al.
4,573,681 A 3/1986 Okada
4,711,452 A 12/1987 Dickinson et al.
4,718,672 A 1/1988 Okada
5,388,829 A 2/1995 Holmes
5,580,055 A 12/1996 Hagiwara
5,688,172 A 11/1997 Lorenzo Regidor (Continued)

FOREIGN PATENT DOCUMENTS

DE 3105266 9/1982

(Continued)

OTHER PUBLICATIONS

Machined English Translation of JP 2001-062032 A. Including abstract, a detailed description and claims.

(Continued)

*Primary Examiner* — Melba Bumgarner
*Assistant Examiner* — Milap Shah
(74) *Attorney, Agent, or Firm* — Nixon Peabody LLP; Daniel J. Burnham

(57) ABSTRACT

In a gaming machine provided with a function called "super time (ST)," which may change the amount of payout coins, a player moves his sight from a displayed stopping order to a displayed reel during such Super Time (ST) game. In order to prevent fatigue by the sight movement, an image display device is provided with a transparent liquid crystal for image attractions and a liquid crystal film for an electronic shutter. They are laminated and disposed in front of the main reel. The electronic shutter can shield an area partially with a software in reference to a gaming status. For example, the electronic shutter does not shield the area and an image attraction is executed since the player may not make an observation push. For the image attraction after the complete reel stop, the electronic shutter shields the area so as to show a clear attraction image.

8 Claims, 31 Drawing Sheets

U.S. PATENT DOCUMENTS

| | | | | |
|---|---|---|---|---|
| 5,934,672 | A | 8/1999 | Sines et al. | |
| 6,315,663 | B1 | 11/2001 | Sakamoto | |
| 6,517,433 | B2 * | 2/2003 | Loose et al. | 463/20 |
| 6,817,946 | B2 | 11/2004 | Motegi et al. | |
| 7,281,980 | B2 * | 10/2007 | Okada et al. | 463/20 |
| 7,465,228 | B2 * | 12/2008 | Okada | 463/20 |
| 2001/0031658 | A1 | 10/2001 | Ozaki et al. | |
| 2004/0029636 | A1 * | 2/2004 | Wells | 463/32 |
| 2004/0150162 | A1 * | 8/2004 | Okada | 273/292 |
| 2005/0192090 | A1 | 9/2005 | Muir et al. | |

FOREIGN PATENT DOCUMENTS

| | | | |
|---|---|---|---|
| EP | 0737494 | | 10/1996 |
| EP | 0887775 | | 12/1998 |
| GB | 1464896 | | 2/1977 |
| JP | H3-72313 | B | 11/1991 |
| JP | 0484103 | | 5/1992 |
| JP | 04-220276 | | 8/1992 |
| JP | 5-123438 | | 5/1993 |
| JP | 6-134111 | | 5/1994 |
| JP | 7-8611 | | 1/1995 |
| JP | 7-100247 | | 4/1995 |
| JP | 07124290 | A2 | 5/1995 |
| JP | 09253271 | A | 9/1997 |
| JP | 11244470 | A | 9/1999 |
| JP | 2000-300729 | | 10/2000 |
| JP | 2001-79200 | | 3/2001 |
| JP | 2001062032 | A | 3/2001 |
| JP | 2001-129185 | | 5/2001 |
| JP | 2001-252394 | | 9/2001 |
| JP | 2001-346937 | | 12/2001 |
| JP | 2002-18011 | | 1/2002 |
| JP | 2002-35280 | | 2/2002 |
| JP | 2002-35281 | | 2/2002 |
| JP | 2002-35282 | | 2/2002 |
| JP | 2002-078847 | | 3/2002 |
| JP | 2002-113208 | | 4/2002 |
| JP | 2002-143524 | | 5/2002 |
| JP | 2002-172205 | | 6/2002 |
| JP | 2002-177450 | | 6/2002 |
| JP | 2002-177504 | | 6/2002 |
| JP | 2002-200219 | | 6/2002 |
| JP | 2002-200219 | | 7/2002 |
| JP | 2002-210117 | | 7/2002 |
| JP | 2002-210124 | | 7/2002 |
| JP | 2002-210146 | | 7/2002 |
| JP | 2002-224338 | | 8/2002 |
| JP | 2002-233607 | | 8/2002 |
| JP | 2002-272935 | | 9/2002 |
| JP | 2002-272936 | | 9/2002 |
| JP | 2002-292037 | | 10/2002 |
| JP | 2003-117129 | | 4/2003 |
| JP | 2003-117141 | | 4/2003 |
| JP | 2003-164612 | | 6/2003 |

OTHER PUBLICATIONS

Machined English Translation of JP 09-253271 A. Including abstract, a detailed description and claims.

Machined English Translation of JP 11-244470 A. Including abstract, a detailed description and claims.

Machined English Translation of JP 07-124290. Includes abstract, detailed description, claims, and description of drawings.

Patent Abstracts of Japan, Publication No. 04220276, Publication Date: Aug. 11, 1992.

Pachisuro Kouryaku Magazine, Aug. 2002, pp. 4-9, Published by Futabasha Publishers Ltd. in Japan on Aug. 1, 2002. "NeoPlanet XX".

Pachisuro Kouryaku Magazine, Jun. 2001, pp. 8-12, Published by Futabasha Publishers Ltd. in Japan on Jun. 1, 2001. "CrazyRacer".

Pachisuro Kouryaku Magazine, Feb. 2002, pp. 4-10, Published by Futabasha Publishers Ltd. in Japan on Feb. 1, 2002. "ThunderV2".

Translation of JP 2000-3000729 A. Machine English translation of abstract, detailed description, and claims.

* cited by examiner

Fig. 8 A

| | Left reel |
|---|---|
| 21 | Red 7 |
| 20 | Cherry |
| 19 | Bell |
| 18 | Replay |
| 17 | Red 7 |
| 16 | BAR |
| 15 | Replay |
| 14 | Bell |
| 13 | 7 with sword |
| 12 | Cherry |
| 11 | Bell |
| 10 | Replay |
| 9 | BAR |
| 8 | 7 with sword |
| 7 | Bell |
| 6 | Replay |
| 5 | 7 with sword |
| 4 | Watermelon |
| 3 | Bell |
| 2 | Replay |
| 1 | 7 with sword |

40L'

Fig. 8 B

| | Middle reel |
|---|---|
| 21 | Red 7 |
| 20 | Replay |
| 19 | Watermelon |
| 18 | 7 with sword |
| 17 | Bell |
| 16 | 7 with sword |
| 15 | Replay |
| 14 | Cherry |
| 13 | Bell |
| 12 | 7 with sword |
| 11 | Replay |
| 10 | Watermelon |
| 9 | BAR |
| 8 | Bell |
| 7 | Red 7 |
| 6 | Replay |
| 5 | Bell |
| 4 | Replay |
| 3 | BAR |
| 2 | 7 with sword |
| 1 | Bell |

40C'

Fig. 8 C

| | Right reel |
|---|---|
| 21 | Cherry |
| 20 | Bell |
| 19 | Replay |
| 18 | 7 with sword |
| 17 | Watermelon |
| 16 | Bell |
| 15 | Replay |
| 14 | 7 with sword |
| 13 | BAR |
| 12 | Bell |
| 11 | Replay |
| 10 | 7 with sword |
| 9 | Watermelon |
| 8 | Replay |
| 7 | Bell |
| 6 | Replay |
| 5 | BAR |
| 4 | Red 7 |
| 3 | Bell |
| 2 | Replay |
| 1 | 7 with sword |

40R'

Fig. 9

| Symbol combination | In Common gaming (In bonus internal winning) | Common gaming in BB | JAC(ranked pattern) gaming |
|---|---|---|---|
| Red 7—Red 7 —Red 7 | 15+BB | | |
| BAR—BAR—BAR | 15+RB | | |
| 7 with sword —7 with sword —7 with sword | 15+SB | | |
| Watermelon —Watermelon —Watermelon | 3 | 15 | |
| Bell—Bell—Bell | 6 | 7 | |
| Cherry —ANY—ANY | 1 | 1 | |
| Replay—Replay —Replay | Replay | 1+RB | 15 |

Fig. 10

| Table No. | left middle right | left right middle | middle left right | middle right left | right left middle | right middle left |
|---|---|---|---|---|---|---|
| 1 | O | × | × | × | × | × |
| 2 | × | O | × | × | × | × |
| 3 | × | × | O | × | × | × |
| 4 | × | × | × | O | × | × |
| 5 | × | × | × | × | O | × |
| 6 | × | × | × | × | × | O |

O··· prize
×··· not prize

* At any observation push timing.

Fig. 11

| Winning pattern | Random number range | Winning probability |
|---|---|---|
| SB | 0~2298 | 2299/16384 |
| Bell | 2299~11024 | 8726/16384 |
| Watermelon | 11025~11165 | 141/16384 |
| Cherry | 11166~11385 | 220/16384 |
| Replay | 11386~13630 | 2245/16384 |
| BB | 13631~13668 | 38/16384 |
| RB | 13669~13696 | 27/16384 |
| Loss | 13697~16383 | 2686/16384 |

Random number range: 0~16383

Fig. 12 A

Start command

| | |
|---|---|
| 1 | Internal winning pattern |
| 2 | SB |
| | Bell |
| | Watermelon |
| | Cherry |
| | Replay |
| | BB |
| | RB |
| | Loss |

| | |
|---|---|
| 3 | Gaming status |
| 4 | In Common gaming |
| | In RB internal winning |
| | In BB internal winning |
| | RB in operation |
| | BB in operation |
| | |
| | |
| | |

| | |
|---|---|
| 5 | Selection stop table |
| 6 | Table No.1 |
| | Table No.2 |
| | Table No.3 |
| | Table No.4 |
| | Table No.5 |
| | Table No.6 |
| | |
| | |

Fig. 12 B

Reel stop command

| | |
|---|---|
| 1 | Stop order |
| 2 | First stop |
| | Second stop |
| | Third stop |
| | |
| | |
| | |
| | |
| | |

| | |
|---|---|
| 3 | Stop reel |
| 4 | Left reel |
| | Middle reel |
| | Right reel |
| | |
| | |
| | |
| | |
| | |

| | |
|---|---|
| 5 | Stop psition |
| 6 | 0~21 |

Fig. 12 C 1 gaming completion command

| | |
|---|---|
| 1 | Prize type |
| 2 | SB |
| | Bell |
| | Watermelon |
| | Cherry |
| | Replay |
| | BB |
| | RB |
| | Loss |

| | |
|---|---|
| 3 | Bonus gaming state |
| 4 | Common gaming 1 in BB |
| | Common gaming 2 in BB |
| | Common gaming 3 in BB |
| | RB Gaming 1 |
| | RB Gaming 2 |
| | RB Gaming 3 |
| | RB completion |
| | BB completion |

Fig. 19 A

| Winning category | Prize category | | | |
|---|---|---|---|---|
| | BB | RB | Watermelon | SB |
| Win | 0~45 | 0~56 | 0~20 | 0~11 |
| Loss | 46~127 | 57~127 | 24~127 | 12~127 |

Random number range: 0 to 127

Fig. 19 B

| Number of bells displayed | Prize category | | | |
|---|---|---|---|---|
| | BB | RB | Watermelon | SB |
| All | 0~84 | 0~96 | 0~20 | 0~8 |
| Appearing number - 1 | 85~121 | 97~127 | 21~52 | 9~21 |
| Appearing number - 2 | 122~127 | — | 53~90 | 22~38 |
| Appearing number - 3 | — | — | 91~116 | 39~95 |
| Appearing number - 4 | — | — | 117~123 | 96~120 |
| Appearing number - 5 | — | — | 124~127 | 1221~127 |

Random number range: 0 to 127

Fig. 20

| Established flag | BR continuance number | | | |
|---|---|---|---|---|
| | 10 games | 50 games | 100 games | Loss |
| Watermelon | 0~10 | 11~13 | 14~15 | 16~127 |
| Two cherries | 0~6 | 7~10 | — | 11~127 |
| Loss | 0~14 | — | 15~24 | 25~127 |

Random number range: 0 to 127

GAME MACHINE HAVING A SHUTTER CONTROL FOR BLOCKING VARIABLE DISPLAYS ACCORDING TO A STOP CONTROL SELECTION HAVING A STOPPING ORDER

CROSS-REFERENCE TO RELATED APPLICATIONS

This application is based upon and claims the benefit of priority from the prior Japanese Patent Application No. 2002-240704 filed on Aug. 21, 2002, the entire contents of which are incorporated herein by reference.

BACKGROUND OF THE INVENTION

1. Field of the Invention

The present invention relates to a symbol combination gaming machine such as a slot machine and a pachinko comprising variable display means to varyingly display various symbols and a function to control the varying display to provide a player with a benefit based on the result, and a gaming machine system using a hall management computer to manage a gaming history.

2. Related Art

A slot machine can be cited as a typical example of this kind of gaming machine. The slot machine has a plurality of rotating reels, each of which has a plurality of symbols provided on a periphery thereof. A prize may be obtained if a combination of symbols coincide with a predetermined combination at a stopping state after each rotating reel is stopped. For example, the same kind of symbols are lined up on a straight line. The slot machine is configured such that a predetermined amount of coins or giveaway is paid out in the event. In general, types of contingency are often involved to obtain this prize. The gaming machine is characterized by such contingency that a player cannot totally control a game result with his skill.

In order to realize the "contingency", various methods have been adopted. Recently, a control method called "pre-determination" to control the reels to stop based on the result of the lottery after carrying out a software-based prize lottery with a microcomputer is mainly adopted in the slot machine. For example, the slot machine described in Japanese Patent No. 1991-72313 is a so-called pachi-slot gaming machine with stop buttons. The pachi-slot gaming machine comprises random number sampling means to sample a random number based on the start lever operation by a player and a prize probability table separated into each random number range of "big hit," "mid hit," and "small hit" depending on the rank of each prize pattern. Then, it determines that the prize pattern is won to establish a hit (winning) flag of the relevant prize pattern if a sampled random number falls on the winning section of the prize probability table. These winning flags include the winning flag of the prize pattern called "small prize pattern" in which about ten pieces of coins are discharged by matching predetermined symbols (e.g., "bell" or "cherry") on an activated pay line, and the one called a "bonus pattern" a state to generate a prize more easily than normal gaming states during a predetermined times of gaming, to payout about 100 to 400 pieces of coins by predetermined symbols matched (e.g., "7" or "BAR" symbol).

The state of winning flag established is the one called "internal winning" in general. A related prize pattern is just allowed to be lined up on the pay line and no prize is generated actually. In order to generate a prize, rotating prize symbols will be controlled with a timing to stop them on a pay line (normally, within four segments). This operation may be called "observation push." The term, "observation push," refers to carrying out the stopping operation by carefully observing each of the reels so as to have desirable symbols on a pay line. If this operation timing is bad, prize is not generated though the internal winning is generated. This state is called "missed winning."

This missed winning, in a large sense, may be caused by the missed observation push. The causes include some patterns. First, an aimed symbol has been determined, however, a player can not recognize varying symbols and stops reels at a rough estimate to fail. Second, there are a plurality of prize patterns that may get internal winning during the current game, and a player does not know which symbol to be stopped and fail.

In the former case, a player can improve the accuracy in some measure if he is skilled in the observation push technique. However, in the latter case, a play must understand the internal winning state which can not be seen from outside. However much a player skilled in the observation push, it is not possible to improve the accuracy of the observation push.

On the contrary, if an internal winning pattern is informed, it is possible to realize gaming states such as a bonus game in which a lot of coins can be obtained even in the ordinary gaming state. There are gaming machines having a function called "Assist Time (AT)," that reduces the occurrence of the missed winning and pays out a larger amount of coins than in the normal game without notification, by taking advantage of game property specific to pachi-slot, when predetermined conditions are met, by notifying the internal winning, further, a type of the internal winning pattern during a predetermined period. A state during AT falls into the category of the "gaming state" mentioned below. But it is possible to specify to practically pay out coins comparable to that of the bonus game.

There is also a function "Super Time (ST)" that changes the amount of coins paid out based on whether winning of "internal winning state" is supported or not. When a rotating reel is controlled to stop by the operation of a stop button by a player, a plurality of "stop tables" for determining the number of segments slipped from the symbol position at which the stop operation has been carried out are provided, a stop table is selected by a random number lottery at every time when a winning pattern is won internally. Here, being won internally refers to getting the internal winning. The stop control of the function is composed that no winning is generated, even if buttons are so pressed at the timing by the observation push that the reel should stop on the activated pay line, unless a stop operation is carried out in the order of the stop operation specified in the stop table. The function of Super Time (ST) realizes a large number of coins comparable to the bonus game as "AT function" mentioned above by assigning an "announced" state of the type of the stop table selected and an "unannounced" state of that to the selected stop table.

For example, if there are three stop buttons, one for stopping the left reel, one for stopping the middle reel, and one for stopping the right reel, the six types of operation orders of "left stop, middle stop, right stop," "left stop, right stop, middle stop," "right stop, left stop, middle stop," middle stop, right stop, left stop, and "middle stop, left stop, right stop" are prepared and arrangements are made so that winning is not generated unless operation is performed exactly according to the operation order of the stop table selected by the random number lottery.

When Super Time (ST) game occurs, the order in which reels are to be stopped (stop buttons are to be operated) is notified by back lamps provided in the interior of the respective reels, lamps provided in correspondence to the respective reels, or a liquid crystal display device, dot display device, or other image display device, an audio output generated from a speaker, etc. For example, in the case where the stopping order is notified by use of back lights, the back light of the reel to be stopped is turned on and the other back lights of the other reels are turned off to indicate the reel (stop button) that is to be subject to a stopping operation.

However, in a case where the means of stopping order notification is an image display device or lamp, etc., since a player needs to perform the reel stopping operation upon checking the indication contents displayed by the image display device or lamp and cannot avoid performing a sight movement form “display device” to “reel”, fatigue may be increased by playing in the Super Time (ST) gaming state.

Also, in the case of stopping order notification by audio means, the notified contents may not be heard well due to game sound generated by gaming machines in the surroundings, for example, when the bonus game is occurring at an adjacent gaming machine.

In the case of stopping order notification by means of reel back lights, though the sight line movement, difficulty of hearing an audio output, etc., do not occur, it is difficult to recognize whether or not a back light is lit in a case where the illumination of a parlor is comparatively bright, etc.

SUMMARY OF THE INVENTION

An object of the present invention is to provide a gaming machine, with which a large amount of coins are paid out upon indication of an operation method that is advantageous to a player, wherein the contents of the indication are notified to the player infallibly and enables a game to be carried out agreeably.

According to the present invention, a gaming machine comprises; variable display means for varyingly displaying a plurality of symbols; lottery means for executing a lottery of prize patterns; stop control means for controlling and stopping the above-mentioned varying display; stop control selection means for selecting the type of control of the above-mentioned stop control means upon referencing the result of the above-mentioned lottery; shielding means which is disposed in front of the above-mentioned variable display means; and shielding control means for controlling the above-mentioned shielding means between in a state enabling a player to visually recognize the above-mentioned symbols and in a state disabling the player from visually recognizing the above-mentioned symbols in accordance with the contents of selection by the above-mentioned stop control selection means. The term, “type of control” or “control type,” refers to selections of controlling. Here, the stopping operation and the stop table may be included in the selections.

With this invention, an electronic shutter, which may be composed of a liquid crystal film, is disposed in front of reels, and shielding of the reel parts is controlled in accordance with the game conditions. The variable display means includes a varying display device, which may be composed of one or more reels.

Since the above arrangement enables displaying of just a display area, which is to be displayed in an enhancing manner to a player in accordance with the game conditions, and enables the other display areas to be shielded, information can be transmitted infallibly to the player without being affected by the position of installation of the display device, brightness of a lamp, etc.

Furthermore, with a second embodiment of this invention, the gaming machine comprises special game control means for generating a special gaming state that is advantageous to a player based on a predetermined condition. Then, the above-mentioned shielding control means actuates the above-mentioned shielding means in the above-mentioned special gaming state.

With an embodiment to be described below, the Super Time (ST) gaming state, in which an appropriate stopping order is indicated, is cited as a special state that is advantageous to a player, and in this Super Time (ST) gaming state, the stopping order is indicated by putting the electronic shutter in a transmitting state at the display area of a reel that is to be stopped and in a shielding state at the display areas of other reels.

With the above arrangement, the present arrangement enables the Super Time (ST) gaming state to be completed without movement of the sight line from the image display device, on which the stopping order is displayed, to the reels, thus alleviating the degree of fatigue of the player.

Furthermore, a third embodiment of this invention is characterized in that the above-mentioned shielding means may comprise a shutter, which may be composed of an electronic shutter. The shutter may be formed in a substantially flat shape.

With the embodiment to be described below, a liquid crystal film is cited as an example of an electronic shutter that is arranged to execute the switching between the transmitting and shielding states in accordance with voltage application states.

With the above arrangement, switching between the transmitting and shielding states can be performed instantaneously in accordance with the game conditions and since the shielded areas can be controlled by software, finer attraction control is enabled.

According to the present invention, a gaming machine including a display device comprises a substantially transparent panel disposed on the display device; a image display device for displaying an image, the image display device being provided behind the panel, so as to show the image visibly through the panel; a shutter being disposed behind the image display device; and a variable display device for displaying symbols varyingly, the variable display device being provided behind the shutter such that at least a portion of the symbols is shielded by the shutter, wherein the shutter is controlled such that the portion of the symbols is shielded or shown through the panel based on a control by a player. Here, the image may comprise a still image, a moving image, or a combination thereof.

The image display device may be composed of a display area for image attractions, such as a big winning attraction, various announcement attractions, a preview of the attractions, etc.

Further features of the invention, its nature, and various advantages will be more apparent from the accompanying drawings and the following detailed description.

BRIEF DESCRIPTION OF THE DRAWINGS

FIG. 8A shows, in an unfolded manner, symbols which are placed along an outer peripheral surface of a left reel.

FIG. 8B shows, in an unfolded manner, symbols which are placed along an outer peripheral surface of a middle reel.

FIG. 8C shows, in an unfolded manner, symbols which are placed along an outer peripheral surface of a right reel.

FIG. 9 is a diagram showing symbol combinations and payout numbers of the respective prize patterns.

FIG. 10 is a diagram showing a stop table that is selected when internal winning of a bell prize pattern occurs.

FIG. 11 is a diagram showing a prize probability table.

FIG. 12A shows a list of start commands sent to the sub-control circuit.

FIG. 12B shows a list of reel stop commands sent to the sub-control circuit.

FIG. 12C shows a list of one game completion commands sent to the sub-control circuit.

FIG. 19A shows an attraction preview generation table.

FIG. 19B shows an attraction category selection table.

FIG. 20 shows a BR generation and BR continuing number lottery table.

DETAILED DESCRIPTION OF THE PREFERRED EMBODIMENT

Figure 1:
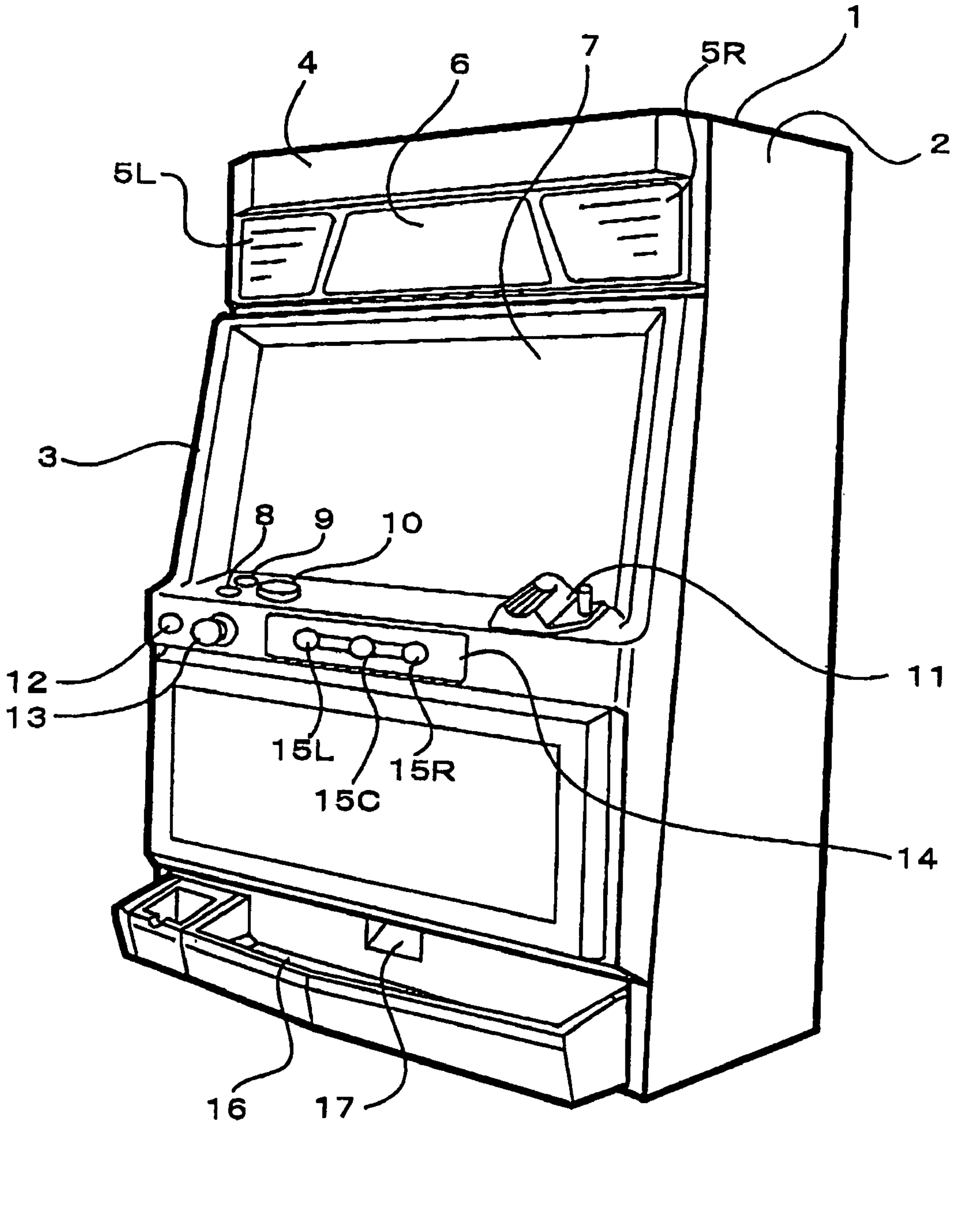
FIG. 1 is a perspective view of a pachi-slot gaming machine of an embodiment according to the present invention.

FIG. 1 is an external view of an embodiment of a gaming machine with stop buttons, that is, a so-called pachi-slot gaming machine according to the present invention. A front door 3 is attached, in a manner enabling opening and closing, to a plywood, box-shaped cabinet 2 of a pachi-slot gaming machine 1. Above the front door 3 are provided a gaming state display lamp 4, which lights up or flashes in different lighting patterns corresponding to the occurrence of the bonus game, error, etc., speakers 5L and 5R, which generate effect sounds and error sounds during game, and a pay table 6, indicating payout numbers of each prize pattern and a brief explanation of game. A substantially vertical panel display device 7 is provided at the center of the front door 3.

At the lower left of the panel display device 7 are provided a 1-BET switch 8, a 2-BET switch 9, and a MAX-BET switch 10. Under the condition that coins are credited, one coin is bet in a game by one push of 1-BET switch 8, two coins are bet in a game by one push of 2-BET switch 9, and three coins, which is the maximum number of coins that can be bet in a single game, are bet in a game by one push of MAX-BET switch 10. By operating these switches, a predetermined pay line is activated. Also, a coin inlet 11, into which coins are loaded, is provided at the lower right of panel display device 7.

C/P (credit/payout) switch 12, by which a player can switch between crediting the coins won in a game and receiving a payout with a push button operation, is provided at the left side of the center of the front door 3. By the switching of C/P switch 12, coins are paid out to a coin outlet 17 at the bottom of the front door 3, and paid out coins are stored in a coin tray 16. A start lever 13, which can be rotated freely within a predetermined angle range, is provided at the right side of C/P switch 12. When the start lever 13 is operated by a player, the reels provided in the inner from the panel display device 7 begin rotating.

At the center of front door 3 is provided a stop operation part 14, by which stopping means for stopping each of the plurality of rotating reels is arranged. Stop operation part 14 comprises a left stop button 15L, a middle stop button 15C, and a right stop button 15R, and a player can freely determine the order in which these stop buttons 15L, 15C, and 15R are pushed. In general, a stop operation that is carried out when all reels are rotating is called a "first stop operation," the stop operation that is carried out next is called a "second stop operation," and the stop operation that is carried out last is called a "third stop operation." With the present embodiment, the push of left stop button 15L as the first stop operation is called "normal push," the push of middle stop button 15C as the first stop operation is called "middle push," a and the push of right stop button 15R as the first stop operation is called "reverse push."

In the case of a gaming machine with three buttons, there are a total of six stop operation order types. Operating left stop button 15L as the first stop operation, middle stop button 15C as the second stop operation, and right stop button 15R as the third stop operation is called "left-middle-right push." Operating middle stop button 15C as the first stop operation, left stop button 15L as the second stop operation, and right stop button 15R as the third stop operation is called "middle-left-right push." Operating middle stop button 15C as the first stop operation, right stop button 15R as the second stop operation, and left stop button 15L as the third stop operation is called "middle-right-left push." Operating left stop button 15L as the first stop operation, right stop button 15R as the second stop operation, and middle stop button 15C as the third stop operation is called "left-right-middle push." Operating right stop button 15R as the first stop operation, left stop button 15L as the second stop operation, and middle stop button 15C as third stop operation is called "right-left-middle push." Operating right stop button 15R as the first stop operation, middle stop button 15C as the second stop operation, and left stop button 15L as the third stop operation is called "right-middle-left push."

Figure 2:
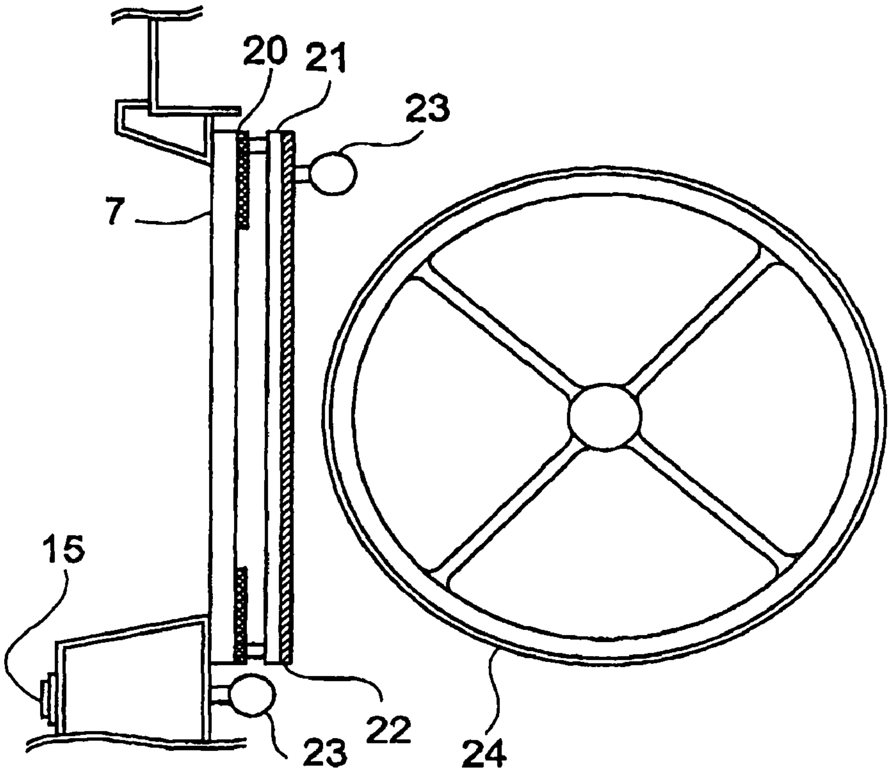
FIG. 2 is a sectional view of the gaming machine around the panel display device.

FIG. 2 is a sectional view of panel display device 7 of pachi-slot gaming machine 1. At the inner surface side of panel display device 7, which is composed of a transparent acrylic plate, are laminated on a sheet 20 including a transparent film having a design printed on, an image display device 21, made of a ITO (Indium Tin Oxide) device or other transparent liquid crystal display devices, and an electronic shutter 22, which is composed of a liquid crystal film, etc. The sheet 20 may have a symbol, a picture, or the like on a surface thereof. At the upper and lower parts at the inner surface side of the panel display device are provided with cold cathode-ray tubes 23 that serve the functions of a back light for the liquid crystal display and an illumination device for illuminating the symbols on reels 24. With the present embodiment, an attraction display is composed of a panel display device 7, a sheet 20, an image display device 21, and an electronic shutter 22. In regard to a function of each display element, the first feature is provided on the sheet 20, and the sheet 20 is characterized in that it is made visually recognizable to the player at all times, regardless of the attraction control state of pachi-slot gaming machine 1. The image display device 21 is a display area for image attractions, such as a big winning attraction, various announcement attractions, a preview of the attractions, etc. With the electronic shutter 22, by the switching between the transmitting and shielding of predetermined areas in accordance with voltage application states, that is, by the switching between a state enabling visual recognition of the symbol of a reel 24 and a state disabling visual recognition of the symbol of a reel 24, the switching between normal display of an attraction executed on the image display device (a state in which reel 24 is shielded by the electronic shutter and visual recognition of only the attraction display is enabled) and semi-transparent (or substantially transparent) display (state in which the reel symbol in the background can be visually recognized through the attraction display) is enabled.

Figure 3:
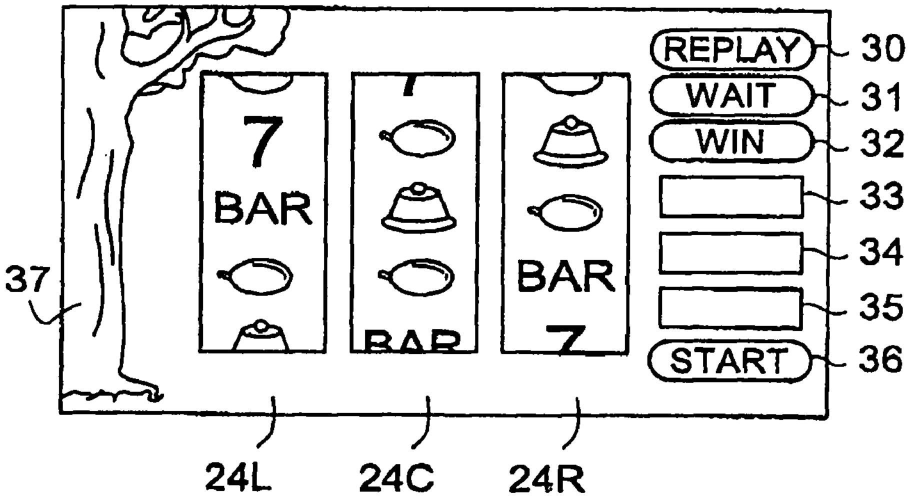
FIG. 3 is a front view of the panel display device.

FIG. 3 is an enlarged view of panel display device 7. At the center of the panel display device are provided a left reel 24L, a middle reel 24C, and a right reel 24R, which constitute the variable display means. At the right side of the front panel are provided various game condition indication lamps and seven-segment display areas. A REPLAY lamp 30 lights up when a replay is awarded in a currently played game. A WAIT lamp 31 is lit when start lever 13 is operated in the current game without 4.1 seconds having elapsed since operation in a previous game and thereby notifies that the WAIT time is in progress. A WIN lamp 32 becomes lit at a predetermined probability in a case where internal winning of a bonus winning combination is realized, thereby notifying that the internal winning of a bonus is realized at 100% certainty. A start lamp 36 becomes lit when a coin loading operation, the operation of any of the various BET switches, or other betting operation is performed and acceptance of the operation of start lever 13 becomes activated. In-bonus information display area 33 displays the remaining number of times in which normal game is enabled in the big bonus ("BB," herein after) state, etc., and mainly notifies the conditions of progress of the bonus game. Credit display area 34 displays the number of coins credited within the gaming machine. Payout display area 35 displays the number of coins paid out upon generation of winnings. If the C/P switch 12 is in the credit state, the coins to be paid out are credited. If the C/P switch is in the payout state, the coins to be paid out are paid out.

Figure 4:
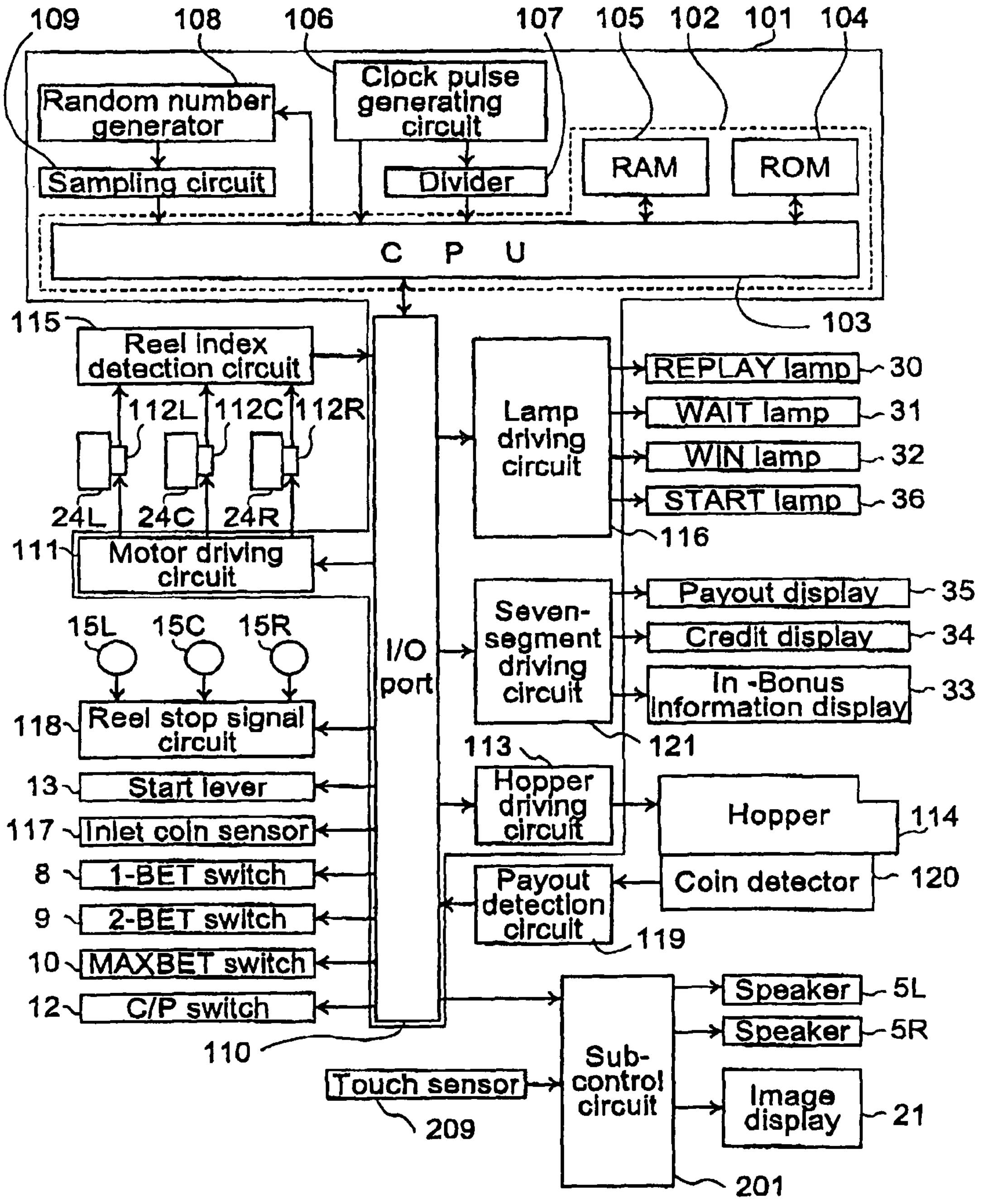
FIG. 4 is a block diagram showing a main control circuit.

FIG. 4 is a block diagram of a circuit for realizing the operation of pachi-slot gaming machine 1 shown in FIG. 1. A control unit of this embodiment is mainly composed of two control circuits. Game control means may include the control unit. A main control circuit 101 controls various electrically connected peripheral devices based on input signals from various detectors. A sub-control circuit 201 controls the attraction images displayed on the image display device 21, effect sounds generated from speakers 5L and 5R, etc., based on game information sent from main control circuit 101 and operation inputs from a touch panel provided in panel display device 7.

Main control circuit 101 is mainly comprised of a microcomputer 102, which is set up on a circuit board, and is additionally composed of a circuit for random number sampling. Microcomputer 102 comprises a ROM 104, in which a game program and data are stored in advance, a CPU 103, which carries out control operations according to the game program in ROM 104, and a RAM 105, which provides the working area necessary for the control process.

A clock pulse generating circuit 106 and a frequency divider 107 for generating standard clock pulses, a random number generator 108 for generating random numbers to be sampled, and a sampling circuit 109 for sampling random numbers based on signals from a start lever 13 to be described below are connected to CPU 103. Random number sampling may be carried out by software processing in microcomputer 102. In that case, random number generator 108 and sampling circuit 109 may be omitted.

A control program for controlling various operations of the pachi-slot gaming machine, a prize probability table, to be used in the probability lottery process described below for determining whether or not a random number obtained based on an operation of start lever 13 corresponds to a win, a stop table, for determining the stopping positions of reels 24L, 24C, and 24R based on the operations of stop buttons 15L, 15C, and 15R, various gaming information commands, sent to sub-control circuit 201, etc., are stored in ROM 104 of microcomputer 102.

Various peripheral devices (actuators) are connected to CPU 103 via an I/O port 110.

A motor driving circuit 111 controls stepping motors 112L, 112C and 112R to rotate reels 24L, 24C, and 24R respectively according to driving signals from CPU 103. Moreover, motor driving circuit 111 controls the stopping of stepping motors 112L, 112C, and 112R according to stop control signals from CPU 103.

A hopper driving circuit 113 controls a hopper 114 as a coin payout device based on a payout command from CPU 103.

A seven-segment driving circuit 121 controls various display areas (in-bonus information display area 33, credit display area 34, payout display area 35) that are composed of seven-segment LED's.

A lamp driving circuit 116 controls the lighting of various display areas (REPLAY lamp 30, WAIT lamp 31, WIN lamp 32, start lamp 36) that are composed of lamps.

In addition, an image display device 21, the electronic shutter 22, a reel back lamp, etc., are provided as attraction display means or image display means for displaying an image varyingly, and are controlled by the sub-control circuit 201.

The major input signal generation means that generate input signals required by microcomputer 102 for generating control signals for the respective driving circuits include start lever 13, 1-BET switch 8, 2-BET switch 9, MAX-BET switch 10, C/P switch 12, inlet coin sensor 117, reel stop signals circuit 118, reel index detection circuit 115, payout detection circuit 119, etc. These are also connected to CPU 103 via I/O port 110.

Start lever 13 detects a start operation by a player. Inlet coin sensor 117 detects coins that are loaded from coin inlet 11 and passed through a selector for blocking deformed coins. Reel stop signal circuit 118 generates stop signals upon detecting the operations of the respective stop buttons 15L, 15C and 15R. Reel index detection circuit 115 supplies CPU 103 with symbol position reset signals upon receiving signals from a rotation reference position detection switch in a stepping motor. Payout detection circuit 119 supplies CPU 103 with payout number signals upon receiving signals from a coin detector 120 in hopper 114.

Figure 6A:
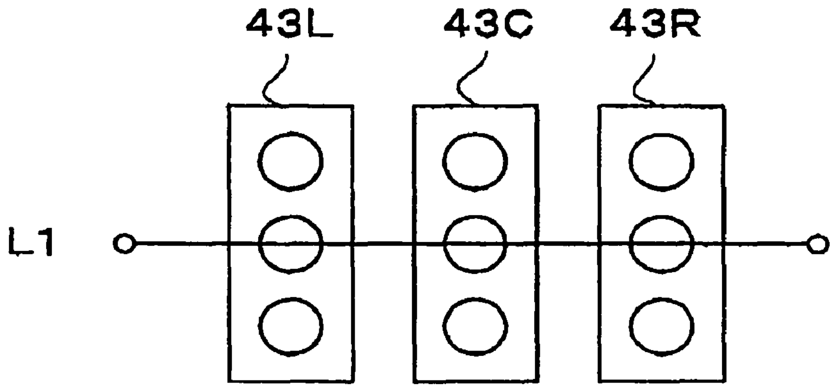
FIG. 6A shows a single pay line.
Figure 6B:
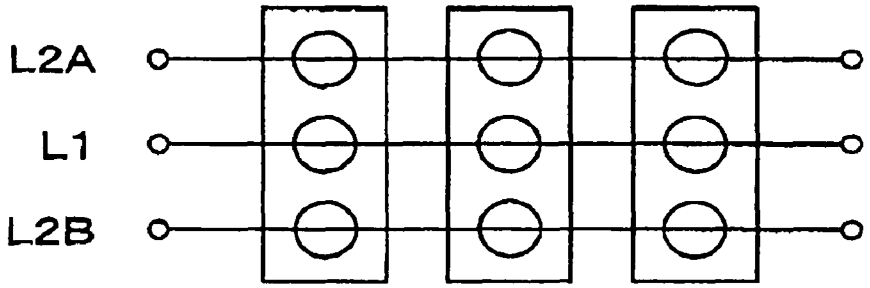
FIG. 6B shows a plurality of pay lines.
Figure 6C:
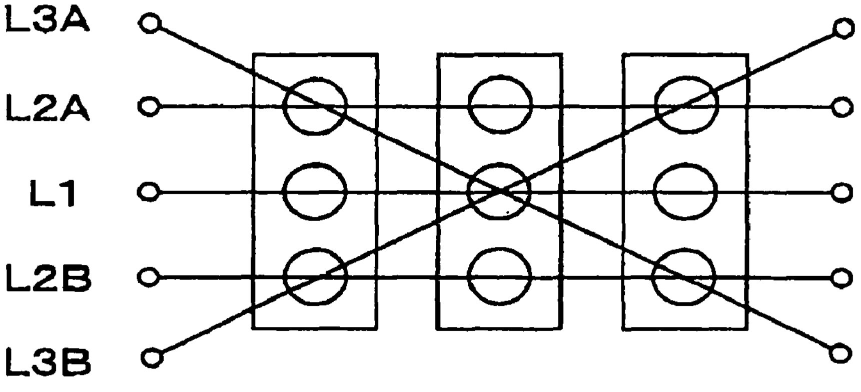
FIG. 6C shows a plurality of pay lines including diagonal lines.

How these driving circuits are controlled within the flow of a game sequence will now be described. First, from the point at which the power switch of pachi-slot gaming machine 1 is turned on, random number generator 108 generates a random number within a fixed numerical range. When inlet coin sensor 117 detects the loading of coins by a player or if coins are credited, when a bet operation by 1-BET switch 8, 2-BET switch 9, or MAX-BET switch 10 is performed, an activated line that is in accordance with the number of betted coins is displayed on the image display device 21. With regard to the betting operation, as shown in the enlarged view of display windows 43L, 43C, and 43R in FIGS. 6A, 6B, and 6C, a center line L1 is made an active pay line (abbreviated hereinafter as "active line") by a one-bet operation, a top line L2A and a bottom line L2B are made active lines in addition to center line L1 by a two-bet operation, and a cross-down line L3A and a cross-up line L3B are made active lines in addition to center line L1, top line L2A, and bottom line L2B by a three-bet operation.

Next, when start lever 13 detects the game starting operation by a player, a random number is sampled by sampling circuit 109. The sampled random number is compared with the prize probability table stored in ROM 104, and if there is a winning combination, a winning flag for the corresponding prize pattern is set to on. This software-base lottery process is referred to as the "probability lottery process," and the details thereof will be described below.

Drive pulses are supplied to each of the stepping motors 112L, 112C, and 112R via motor driving circuit 111 and each of the reels 24L, 24C, and 24R starts rotating. CPU 103 monitors the drive pulses supplied and updates a "pulse counter" secured in RAM 105. The pulse counter value is monitored, and if it becomes a predetermined value, a symbol is determined to have moved by one symbol (also referred to as "one segment"), and the "symbol counter" secured in RAM 105 is incremented by one count.

For example, if a stepping motor performs one rotation at 400 pulses and 21 symbols are arranged on the outer peripheral surface of a reel, since a symbol moves by one segment by about 19 pulses, CPU 103 determines a symbol to have moved by one segment and increments the "symbol counter" by one count when the pulse counter value becomes 19 pulses.

On the other hand, with reels 24L, 24C, and 24R, each time the reference point of a symbol passes the center line L1 of display window 43, an index detection signal is generated and a reset pulse is input into CPU 103 through reel index detection circuit 115. Upon detecting the input of the reset pulse, CPU 103 clears the symbol counter that is counted up by RAM 105. Correspondence between a symbol position recognized on a software basis and the one actually displayed in the display window 43 is thus ensured.

When reels 24L, 24C, and 24R reach a constant rotation speed after a predetermined period of time from when they start rotating, operations of stop buttons 15L, 15C, and 15R are activated. When a player carries out a stop operation, a reel stop signal is input into CPU 103 via reel stop signals circuit 118. After a processing such as the selection of the stop position, etc., on a software basis, a stop pulse is supplied to the corresponding stepping motor 112L, 112C, or 112R via motor driving circuit 111 and the corresponding reel 24L, 24C, or 24R is stopped.

In carrying out stop control of reels 24L, 24C, and 24R, CPU 103, upon receiving a stop signal from reel stop signals circuit 118, stores in a predetermined area of RAM 105 a code number for the symbol on center line L1 as a stop operation position and refers to a stop table that associates the stop operation position with the symbol to be stopped and displayed at center line L1. CPU 103 then stores a symbol stop position corresponding to the stop operation position in a predetermined area of RAM 105, calculates the number of pulses (segments) to be supplied to stop at the intended symbol, and carries out stop control after supplying the calculated number of pulses.

When the reels 24L, 24C, and 24R are all stopped, a prize search is carried out. In the prize search, the symbol stop positions stored in RAM 105 are compared with a symbol table stored in ROM 104, and the stop mode of the current game that is stopped in display windows 43L, 43C, and 43R is ascertained. The symbol table is configured so as to correspond to the symbol arrangement drawn on the outer peripheral surface of each reel 24L, 24C, and 24R, associates a code number indicating the order of a symbol from a reference position with a symbol code provided in correspondence to the code number, and serves the role of a software-basis reel band. Then, for each active line L1, L2A, L2B, L3A, and L3B, the stop mode is compared with a prize symbol combination table stored in ROM 104 to determine the existence of a prize. The prize symbol combination table associates a prize symbol combination with the number of coins paid out when a prize is won. Processes are performed upon switching the prize symbols in cases where the active prize symbol combination or number of coins paid out is to be differed according to the gaming state.

CPU 103 pays out a predetermined number of coins from the hopper 114 by supplying a payout signal to hopper driving circuit 113 if "the winning of a prize" is determined in the prize search. At that time, coin detector 120 counts the number of coins that are paid out from hopper 114 and stops the driving signal to the hopper driving circuit and the payout of coins when the count reaches a predetermined number.

Figure 5:
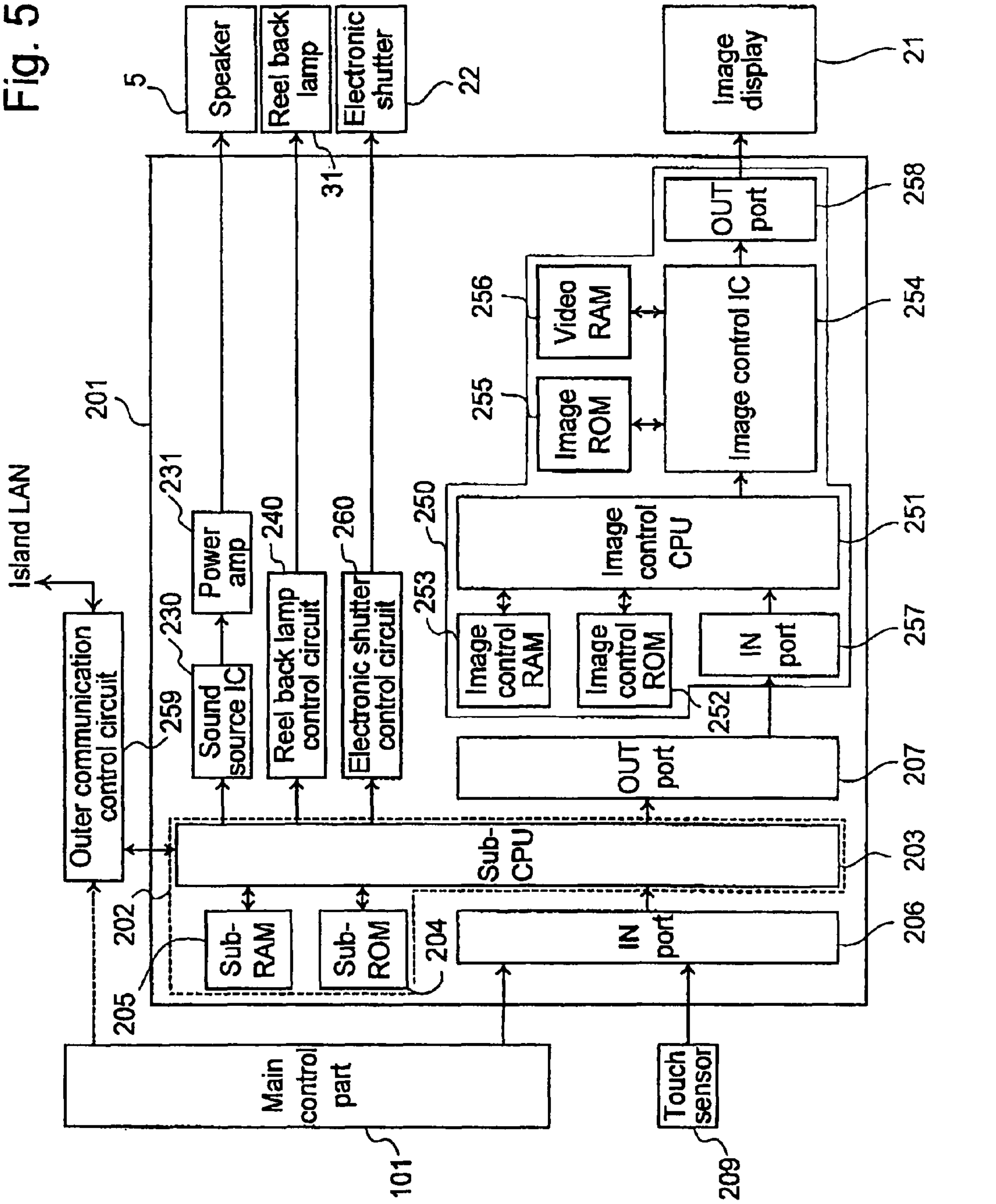
FIG. 5 is a block diagram showing a sub-control circuit.

The block diagram of FIG. 5 shows the configuration of sub-control circuit 201. Sub-control circuit 201 controls peripheral devices for attraction such as image display device 21, electronic shutter 22, speakers 5L and 5R, etc., based on game information from main control circuit 101 and input signals from a touch sensor 209 on the touch panel.

The sub-control circuit 201 is configured with a sub-microcomputer 202 as a main component and is composed of an image control circuit 250 for controlling the image display device 21, a sound source IC 230 for controlling the output of sound from the speakers 5L and 5R, a power amp 231, serving as an amplifier, and a reel back lamp control circuit 240. These control circuits are configured on a circuit board other than that of the main control circuit.

The sub-microcomputer 202 comprises a sub-CPU 203, a sub-ROM 204, serving as storage means, and a sub-RAM 205. Like the main control circuit 101, sub-control circuit 201 in FIG. 5 comprises a clock pulse generating circuit, a frequency divider, a random number generator, and a sampling circuit although they are not shown in the FIG. 5. The sub-ROM 204 stores a communication sequence program for communication with main control circuit 101, an attraction selection table for selecting various attractions based on received game information, a sound sequence program, etc. The sub-RAM 205 is used as a working area for carrying out these control programs.

The sub-CPU 203 determines the attraction to be carried out by various attraction control circuits based on a game information command which is transmitted from main control circuit 101 and passes through an IN port 206. And The sub-CPU 203 sends the determined contents through an OUT port 207 to each attraction control circuit.

The image control circuit 250 is composed with an image control CPU 251, an image control ROM 252, an image control RAM 253, an image ROM 255, a video RAM 256, and an image control IC 254. Image control CPU 251 receives parameters determined by sub-microcomputer 202 through an image control circuit IN port 257 and determines the contents to be displayed on the image display device 21 in accordance with the image control sequence program stored in image control ROM 252. Image control ROM 252 stores a receiving sequence program for an image attraction command transmitted from sub-microcomputer 202, an image control sequence program for controlling image control IC 254, etc. Image control RAM 253 is used as a working area for carrying out the image control program.

Image control IC 254 forms images corresponding to display contents determined by image control CPU 251 using graphic data stored in image ROM 255, stores the images in video RAM 256 temporarily, and outputs the images on the image display device 21 at suitable timings via an image control circuit OUT port 258 to carry out display attractions.

Reel back lamp control circuit 240 is used for attraction display control such as prize attraction and winning flag announcement.

Figure 7:
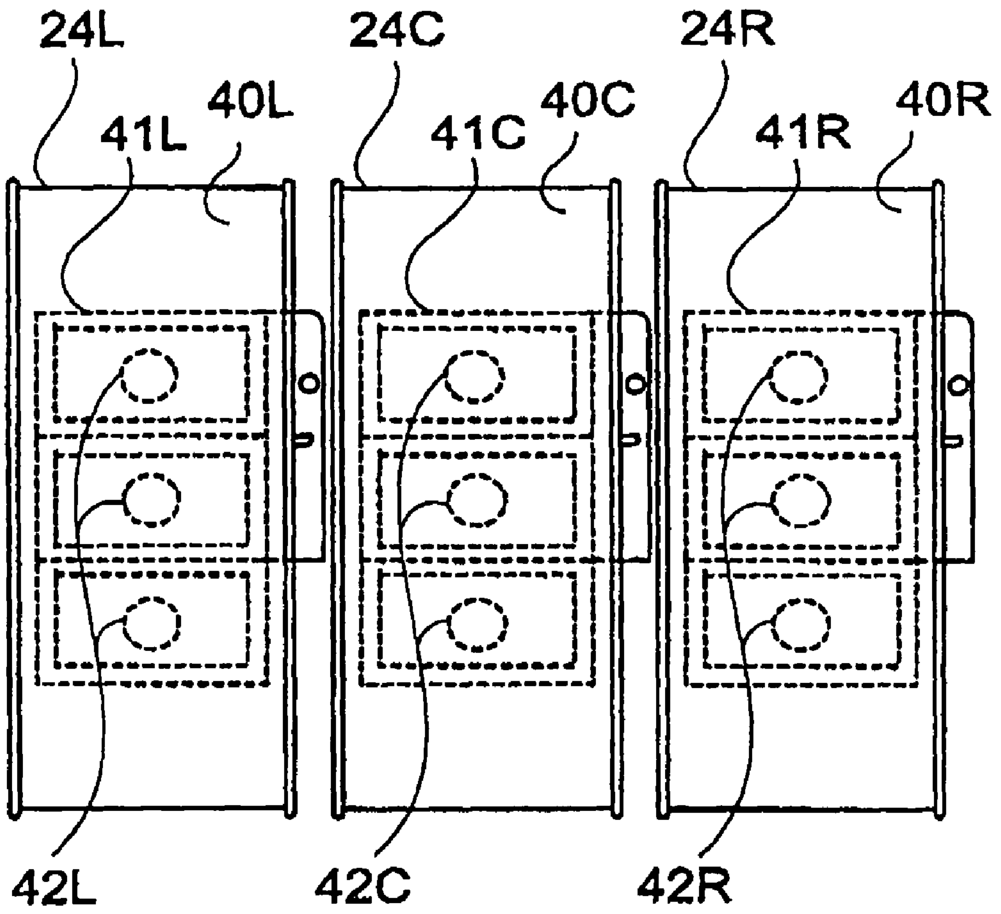
FIG. 7 is a diagram showing reels and back lamps.

FIG. 7 shows an enlarged view of the reels 24L, 24C, and 24R. Reel bands 40L, 40C, and 40R of reels 24L, 24C, and 24R are configured with a semi-translucent film material, and symbols such as "cherry," "7," or the like are printed on the surface with light transmitting inks. Regions other than the symbols are masked with light shielding inks. At the back of reel bands 40L, 40C, and 40R, lamp housings 41L, 41C, and 41R are provided in a manner such that lighting of each lamp will not interfere with other symbol regions. Reel back lamps 42L, 42C, and 42R are contained in the respective chambers of lamp housings 41L, 41C, and 41R. Reel back lamp control circuit 240 controls the blinking of reel back lamps 42L, 42C, and 42R based on parameters determined by sub-microcomputer 202. The prize symbol to be aimed at is suggested to a player, for example, by controlling the blinking of reel back lamps 42L, 42C, and 42R on the pay line when coins are paid out or preparing different blinking modes according to the internal winning patterns and executing an attraction display when a winning flag is established.

An electronic shutter control circuit 260 performs transmitting/shielding control of electronic shutter 22, disposed between the image display device 21 and reels 24L, 24C, and 24R, in accordance with whether or not voltage is applied, and by performing shielding control of the necessary display areas based on contents determined by sub-microcomputer 202, shields inner areas of the image display device 21 that are designated as not being visually recognizable to a player. For example, when during Super Time (ST) game, which is a special gaming state in which an appropriate stopping order is notified in accordance with the selected stop table, start lever 13 is operated, control is performed so that only the display window 43 of the reel to be subject to the first stop operation is made visually recognizable and the display windows 43 of the reels are shielded to infallibly make a player recognize which reel is the reel that is to be subject to the first stop operation.

FIGS. 8A, 8B, and 8C show reel bands 40L, 40C, and 40R being developed on a flat surface. Each of the reels has 21 symbols. Each symbol has a symbol number from 1 to 21, These are stored in ROM 104 in the form of a symbol table. Symbol columns 40L', 40C', and 40R' are varyingly displayed in accompaniment to the rotation drive of reels 24L, 24C, and 24R in the order of the symbol number (ascending order).

FIG. 9 shows the number of coins to be paid out corresponding to the prize symbol combination (prize pattern) in each gaming state.

The internal winning, prizes, and gaming states will now be explained. The internal winning is a state where a win is determined by collating a sampled random number with a prize probability table and the winning flag of the corresponding prize pattern is set to on in the aforementioned probability lottery process.

The winning flag generally exists for all prize patterns. The prize patterns are categorized mainly into two patterns. One prize pattern is a small prize pattern, in which a winning flag cannot be carried over to the next game and a comparatively smaller payout number of coins are paid out. And the other prize pattern is a bonus pattern such as a big bonus (BB) pattern or regular bonus (RB) pattern, in which the winning flag is carried over to the subsequent game until the prize is generated, the internal lottery probability of the prize pattern is increased, and a large payout number of coins are paid out.

The small prize pattern includes, for example, the "cherry" prize pattern, which is won simply when a cherry symbol stops on an active line of the left reel, and the "bell" prize pattern and "watermelon" prize pattern, each of which is won when three symbols stop on the active line. The bonus prize pattern include a big bonus and regular bonus patterns. The regular bonus (RB) is generated, for example, when "BAR-BAR-BAR" is aligned on an active pay line and pays out 15 coins first as the prize. It continues until a bonus game (of one coin bet called JAC game or pattern game) is played 12 times or the prize is generated eight times. A big bonus (BB) is generated when, for example, "red 7-red 7-red 7" are aligned on an active line. It pays out 15 coins first as the prize. During the BB, a game with a raised winning probability such as the small prize pattern or the RB, which is called a general game, can be played up to 30 times. Further, during this period, the RB game can be played up to three times. Though RB is won from a general gaming state (or a common gaming state) when, for example, "BAR-BAR-BAR" become aligned, in the BB state, RB is won from a general gaming state when "Replay-Replay-Replay" become aligned. When a replay prize pattern is won, the same number of coins as the loaded coins are inserted automatically. Therefore, a player can play a game without inserting coins in the next game. A single bonus (SB) is generated when, for example, "7 with sword-7 with sword-7 with sword" are aligned on an active line. It pays out 15 coins first when it is won. A JAC game can then be carried out once. Though the SB has the name of "bonus," a winning flag is not carried over. The winning flag is effective only in the current game as in the small prize pattern.

Gaming states will now be explained. The gaming states can be roughly categorized into three states depending on the existence of a winning flag of the bonus winning combination. They are a general gaming state, where no bonus pattern has been won internally yet, and a bonus internal winning state, where no prize has been generated because all bonus winning symbols are not aligned on the active line (also referred to as "bonus internal winning" or "bonus internally hitting") though the internal winning in a probability lottery process has been achieved, and a bonus game state, where prize symbols have been aligned on the active line during bonus internal winning and a bonus game is being played (also referred to as "enabled bonus").

Furthermore, the bonus internal winning is categorized into a BB internal winning or an RB internal winning depending on the bonus type. The enabled bonus is categorized into either enabled BB or enabled RB.

Besides the bonus prize patterns, there are other gaming states that are advantageous for a player and enable the player to obtain a large number of coins.

For example, there is a so-called "concentrated machine." A high probability table (for example, with an SB internal winning probability of 1/2) and a low probability table (for example, with an SB internal winning probability of 1/20) are prepared as the prize probability table for the SB during the general game. It is known a specific state is provided with the machine such that a lottery for switching to the high probability table (referred to as "plunge lottery") is carried out when the low probability table is used, or that a lottery for switching to the low probability table (generally referred to as "puncture lottery") is carried out when the high probability table is being used. Thus, the number of paid out coins is increased gradually when the high probability table is used.

In addition, a specific state called the "AT (assist time) function" is known. In this specific state, multiple prize patterns that can never be won at the same time are set (for example, the prize patterns, "bell-bell-red 7," "bell-bell-blue 7," and "bell-bell-white 7," are provided with intervals of four segments or more each being set among the symbols, "red 7," "blue 7," and "white 7" on the right reel). In a normal state, since the category of the internal winning pattern is not notified and it is unknown which "7" is to be aimed at, a prize can theoretically be won only at a probability of 1/3 after internal winning. However, in the state called the "AT period," in which the internal winning category is notified, the category of the "7" symbol to be aimed is made known, and the theoretical probability of winning a prize becomes 100% after internal winning as long as the observation push is accurate, and the coins thus increase gradually.

There is also an "Super Time (ST) function," in which stop control is carried out with no prize pattern aligned unless the stopping operation is performed in a predetermined stop order for one internal winning pattern even if the prize pattern is internally won and the observation push is performed precisely. For example, as shown in FIG. 10, 6 types of stop order table from "NO. 1" to "NO. 6" are prepared, and when a bell is internally won in a probability lottery process, the stop table to be used is selected by random number lottery. And if, for example, in the current game, the stop table "NO. 3" is selected, a winning is generated when middle stop button 15C, left stop button 15L and right reel stop button 15R are pressed in the first, second and third stop operation, respectively. For the other 5 types of stopping order, stop control is performed so that bell symbols will not be aligned on the active line even if the bell is won internally.

In a normal state, since this stop order is not notified, the probability of receiving a prize is theoretically only 1/6 after internal winning. However, in the state called the Super Time (ST) period in which the category of the selected stop table is notified. In other words, in the state that the order of the stopping operation should be notified, the theoretical probability of the prize winning becomes 100% after the internal winning so that the number of paid out coins is increase gradually.

As shown in FIG. 9, with the present embodiment, the number of coins paid out differs according to the gaming states even for the same prize symbol. For example, for a watermelon prize pattern, whereas three coins are paid out in a general game or bonus internal winning state, 15 coins are paid out in a state of general game during BB. Though "Replay-Replay-Replay" is a replay prize symbol in a general game or bonus internal winning state, it is an RB prize symbol in a state of general game during BB, and in a JAC game state, it is a prize-pattern prize symbol that pays out 15 coins.

Furthermore, in this embodiment, the aforementioned "Super Time (ST)" is adopted as an advantageous status for a player other than a bonus winning combination and arrangements are made so that Super Time (ST) game is activated when predetermined conditions are fulfilled during a general gaming state. Specifically, when the SB prize pattern or the bell prize pattern is won internally, the information on the order of stopping required for aligning the winning combination of symbols for winning is notified to a player. Therefore, when the SB prize pattern or bell prize pattern is won internally during the period of this specific state, the player can definitely generate a win without generating missed winning by performing operations in accordance with the notified order of stopping.

FIG. 11 is a diagram showing a prize probability table used in the aforementioned probability lottery process. A random number is picked up from the range of "0 to 16383." If the random number belongs to a winning range specified for each prize pattern, the related prize pattern is won internally. For example, if the random number picked up in the current game is "10000," since this belongs to the winning range "2299" to "11024" of the bell prize pattern, the bell prize pattern is won internally. If the random number picked up in the current game is "115000," since this belongs to the loss range of "13669 to 16383," no prize pattern is won internally and the result is a loss.

FIGS. 12A, 12B, and 12C show three tables of game information commands provided from main control circuit 101. In this embodiment, main control circuit 101, which controls prize determination and coin payout, and sub-control circuit 201, which controls the image display device 21 and speakers 5L and 5R, are configured on separate boards. Since game information on the internal winning states of prize patterns and reel stop statuses, which are processed in the main control circuit, are required for the attraction control processed by sub-control circuit 201, the two boards are connected to each other with a straight cable for sequentially sending the required information. The sent commands include a "start command," which is sent when a player operates the start lever 13, a "reel stop command," which is sent when stop button 15L, 15C, or 15R is operated to stop rotating reel 24L, 24C, or 24R, and a "1 game completion command," which is sent when one game is fully completed.

Each command denotes a single type of data with two bytes. The first byte denotes a command type and the last byte denotes a command content. The start command is arranged as six-byte data. The start command is composed of three data types: "internal winning pattern," "gaming state," and "selected stop table." The reel stop command for one time stop operation is arranged as four-byte data. The reel stop command is composed of two data types: "stop order" and "stop reel." The one-game-completion command is arranged as four-byte data. The one-game-completion command is composed of two data types: "prize category" and "bonus game state."

Figure 13A:
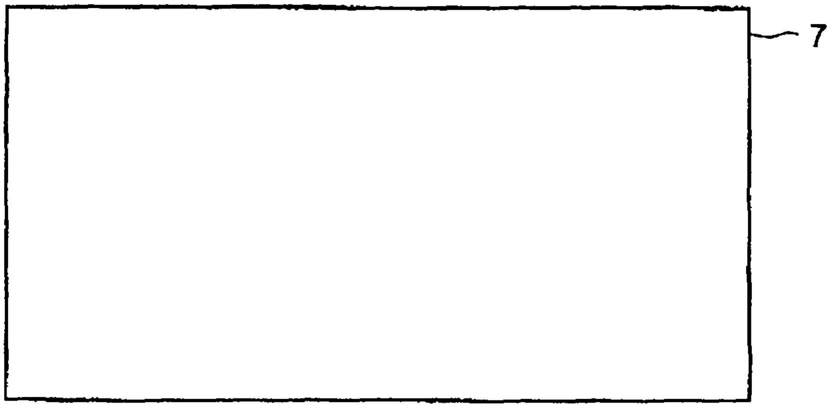
FIG. 13A shows an enlarged and simplified view of the panel display device.
Figure 13B:
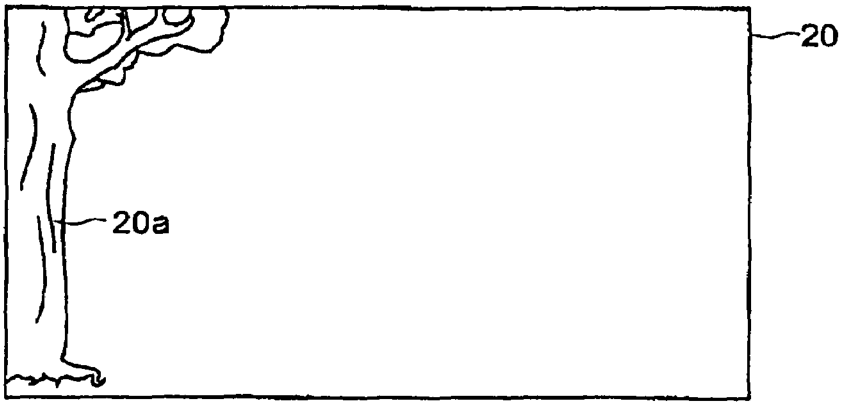
FIG. 13B shows an enlarged view of a sheet.
Figure 13C:
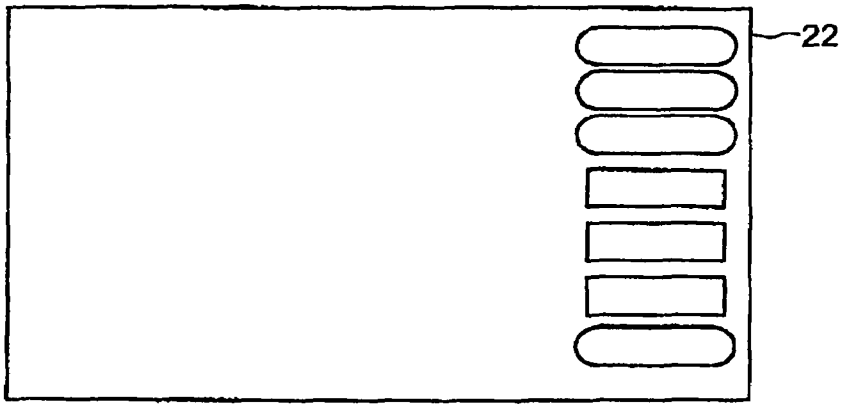
FIG. 13C shows an enlarged view of an electronic shutter.

FIG. 13A shows a front view of panel display device 7. The panel display device 7 is composed of a single plate that is formed of a transparent acrylic plate and plays the role of protection against physical impact from the exterior. FIG. 13B shows a front view of a sheet 20. With the sheet 20, a first design is printed with semi-transparent ink on a transparent film material, and with the present embodiment, a tree design 20*a* as the first design is printed at the left side of the sheet. FIG. 13C shows a front view of electronic shutter 22. Electronic shutter 22 is composed of a liquid crystal film and switching between transparent and non-transparent states is performed in accordance with voltage application states. With the display area for the lamp parts and seven-segment display areas at the right side of the electronic shutter, the transparent state is maintained regardless of whether or not voltage is applied and is thus arranged to be visually recognizable by a player at all times.

Figure 14:
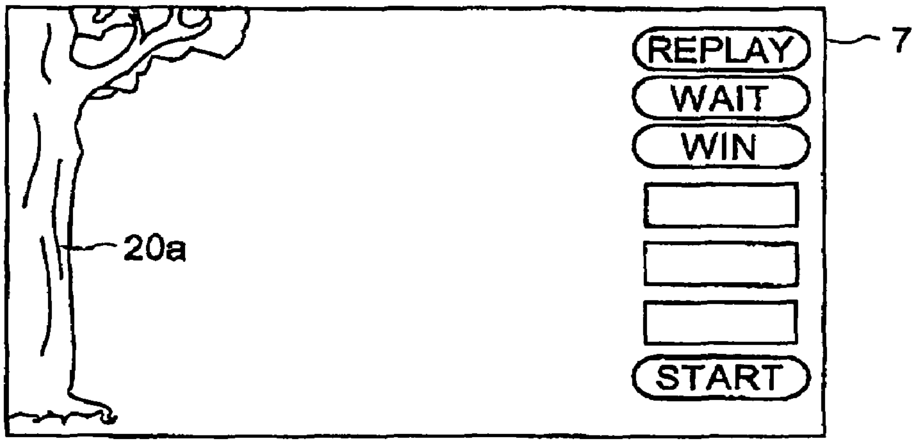
FIG. 14 is an enlarged view of the panel display device.

FIG. 14 is an enlarged view of panel display device 7 in a state in which electronic shutter 22 is in the shielding state (non-voltage-applied state) over the entire area. This display state is, for example, displayed when the power of pachi-slot machine 1 is not on, and whereas reels 24 are hidden by electronic shutter 22 and are not visually recognizable by a player, the sheet 20, due to being provided in front (at the player side) of electronic shutter 22, is not affected by the control state of the electronic shutter and is visually recognizable by a player. Also, the various lamp display areas and seven-segment display areas at the right side of the panel display device are positioned at an inner part of the casing from the electronic shutter 22. The various lamp display areas and seven-segment display areas are visually recognizable to the player since the display area of the electronic shutter 22 is in a transparent state.

Figure 15A:
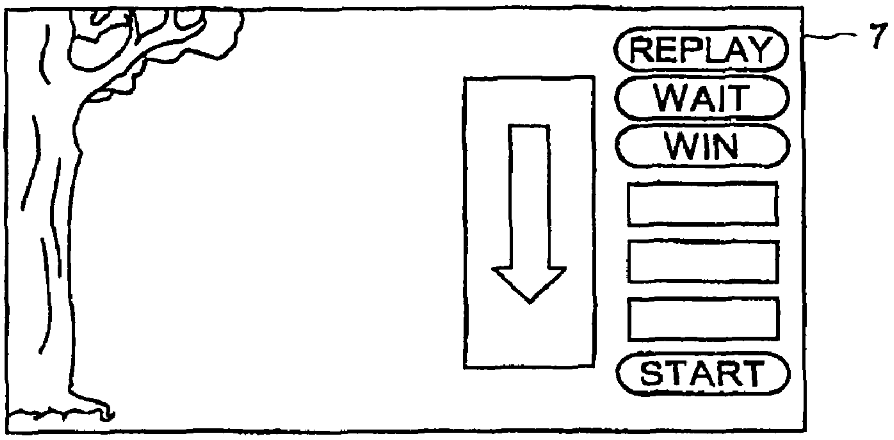
FIG. 15A shows the panel display device prior to the first stop operation during Super Time (ST) game.
Figure 15B:
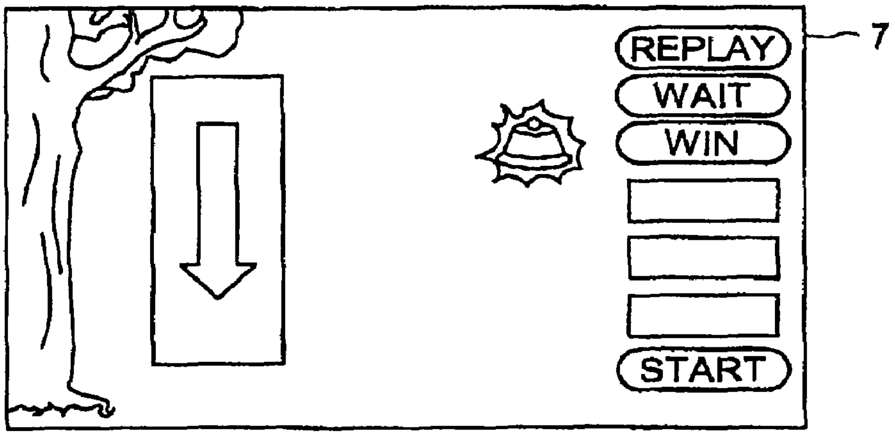
FIG. 15B shows the panel display device after a right stop button is operated by the player during Super Time (ST) game.
Figure 15C:
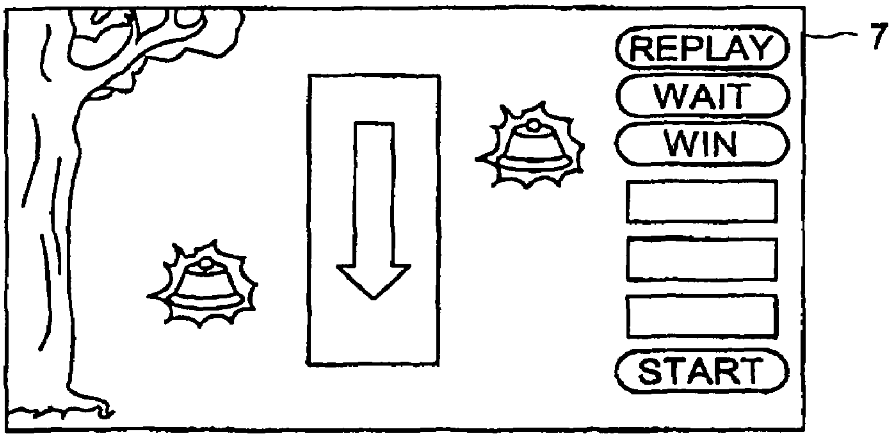
FIG. 15C shows the panel display device after a left stop button is operated by the player during Super Time (ST) game.

FIGS. 15A, 15B, and 15C show diagrams of attraction screens during the Super Time (ST) game, which is a special gaming state. FIG. 15A is a diagram showing, as an example of attraction control during Super Time (ST) game, the display that is displayed on panel display device 7 prior to the first stop operation when a bell is internally won and stop table No. 5 in FIG. 10 has been selected in the current game. With the present embodiment, for attraction control during Super Time (ST) game, electronic shutter 22 is subject to transmitting control only at the display area of the reel corresponding to the stop button which is to be operated for stopping, and the other display areas are subject to shielding control in order to indicate the appropriate stopping operation. Since with stop table No. 5, the first stop operation is the operation of the right stop button, the display areas besides that of right reel 24R are shielded and only the rotating right reel 24R is made visually recognizable to a player in order to indicate to the player that right stop button 15R should be operated for stopping. Here, transmitting control refers to controlling the electronic shutter so that the reel symbol at the rear is made visually recognizable, and as long as the reel symbol is visually recognizable by the player, the electronic shutter does not have to be in a completely transparent state and may be in a semi-transparent state or a colored state. Likewise, the shielding state is not limited to a state in which light is completely blocked and a somewhat semi-transparent state can also be included in the scope of the present invention as long as the reel symbol at the rear is not visually recognizable.

FIG. 15B is a diagram showing panel display device 7 when a player has operated right stop button 15R for stopping in the state of FIG. 15A. Since first stop operation by the right stop button is the valid stop operation, with the display area of right reel 24R, in which the entirety of right reel 24R in rotation was visually recognizable in FIG. 15A, just the bell symbol, which is the internal winning pattern, is made visually recognizable and the other parts of the display area are shielded to notify the player that the stop operation is correct. Also, the display area of left reel 24L, which was shielded in FIG. 15A, is put in a transmitting state and left reel 24L in rotation is made visually recognizable to indicate to the player that operation concerning left reel 24L should be performed.

FIG. 15C is a diagram showing panel display device 7 when a player has operated left stop button 15L for stopping in the state of FIG. 15B. Since second stop operation by the left stop button is the valid stop operation, with the display area of left reel 24L, in which the entirety of left reel 24L in rotation was visually recognizable in FIG. 15B, just the bell symbol, which is the internal winning pattern, is made visually recognizable and the other parts of the display area are shielded to notify the player that the stop operation is correct. Also, the display area of middle reel 24C, which was shielded in FIG. 15B, is put in a transmitting state and middle reel 24C in rotation is made visually recognizable to indicate to the player that operation concerning the remaining middle reel 24C should be performed.

Figure 16A:
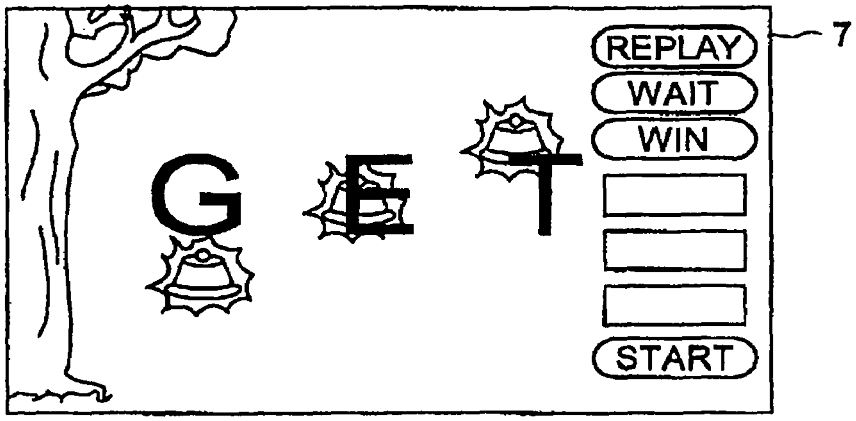
FIG. 16A shows the panel display device at the winning after all stop operations are completed during Super Time (ST) game.

FIG. 16A is a diagram showing panel display device 7 when all stopping operations during Super Time (ST) game have been performed correctly and a win has been achieved. In FIG. 16A, the electronic shutter is subject to transmitting control just at the parts of the bell symbols, which make up the prize pattern, and the bell symbols on reels 24 are made visually recognizable, and the characters, "GET," are displayed on the image display device 21 to notify the player that bells have been won.

Figure 16B:
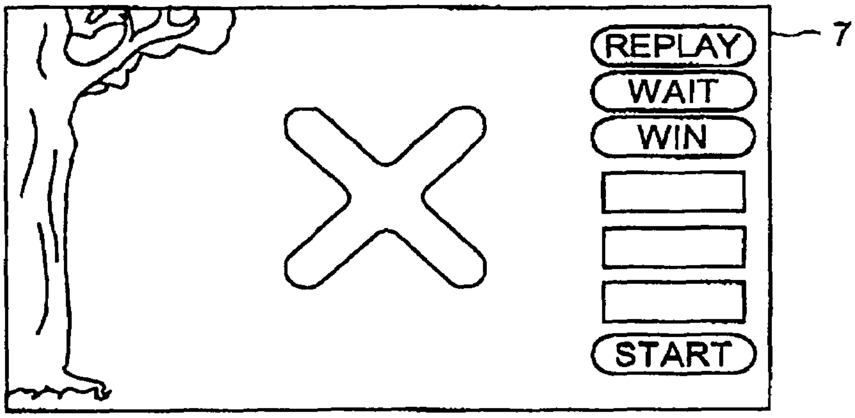
FIG. 16B shows the panel display device when the winning is missed due to erroneous stop operations during Super Time (ST) game.

FIG. 16B is a diagram showing panel display device 7 for a case where missed winning occurred due to erroneous stopping operation during Super Time (ST) game. This is displayed when, for example, in the state of FIG. 15B, middle stop button 15C is operated when the correct operation was to operate left stop button 15L, and a large "x" is displayed at the center of the display area to notify the player that the stopping operation was wrong.

Figure 16C:
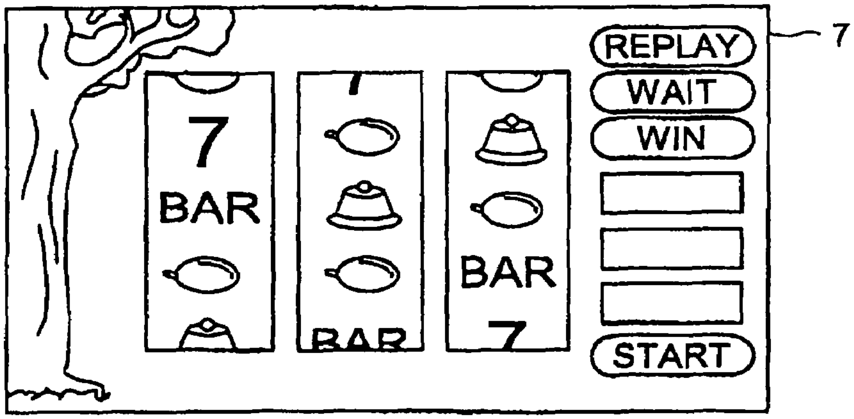
FIG. 16C shows the panel display device when all shielding areas are shielded during Super Time (ST) game.

After display by the attraction control executed as shown in FIG. 16A or 16B is performed for a fixed period of time, all shielded areas are subject to transmitting control as shown in FIG. 16C and the attraction control for one game is thereby ended.

Figure 17A:
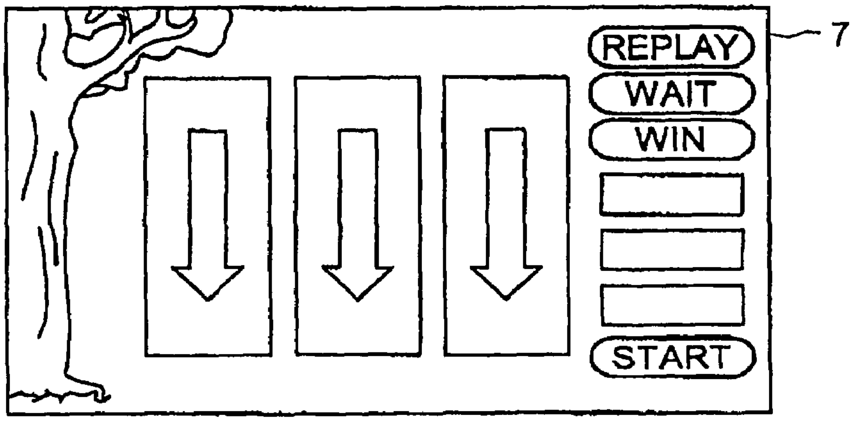
FIG. 17A shows the panel display device when the reels are rotating during an attraction preview.
Figure 17B:
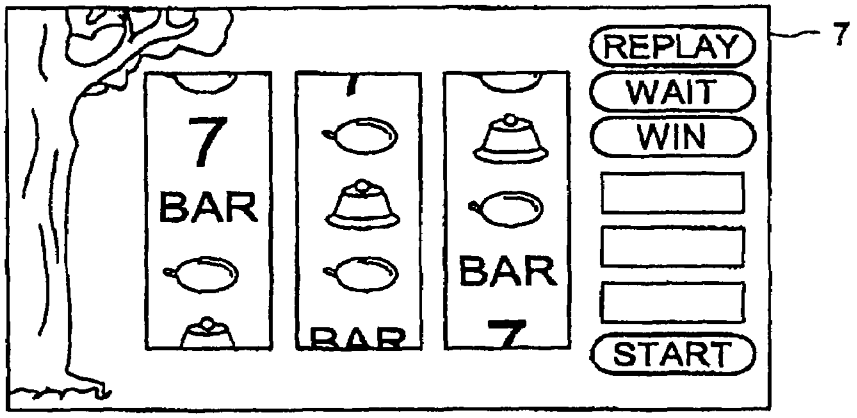
FIG. 17B shows the panel display device when the reels are stopped during the attraction preview.
Figure 17C:
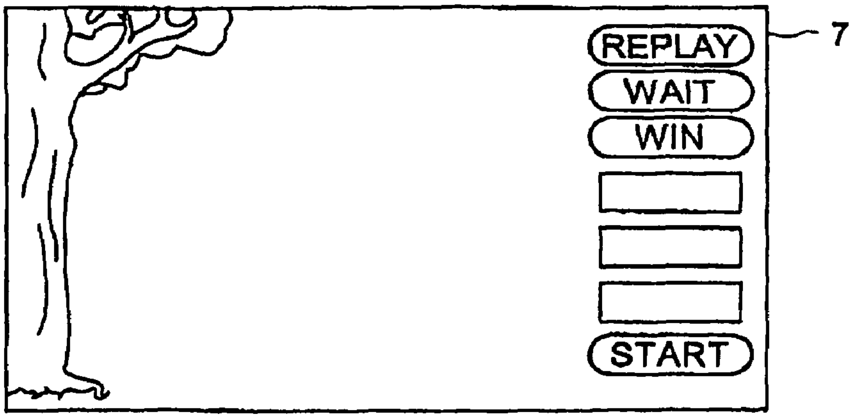
FIG. 17C shows the panel display device when the shutter shields a view of the reels during the attraction preview.

FIGS. 17A, 17B, and 17C show announcement attraction screens that are generated at a predetermined probability after all reels 24L, 24C, and 24R have stopped. With regard to the specific flow of the attraction, first, the reels 24L, 24C, and 24R in rotation are displayed through panel display device 7 (FIG. 17A), and thereafter, all reels are stopped by the stopping operation by a player (FIG. 17B). After all reels have stopped, electronic shutter 22 is put in the shielded state so that reels 24L, 24C, and 24R, which were displayed, become hidden behind the electronic shutter as shown in FIG. 17C.

Next, an announcement attraction based on the internal winning pattern of the current game is executed. With the announcement attraction of the present embodiment, the reliability of establishment of a bonus winning combination is expressed by the degree of matching of the display positions of bell symbols displayed on the image display device 21 and the stop positions of the bell symbols of reels 24L, 24C, and 24R, which are displayed in the stopped state. FIG. 19A shows an announcement attraction generation table. The announcement attraction generation table is referenced when, in a case where BB, RB, watermelon, or SB is internally won, the lottery for determining whether or not to execute an announcement attraction is executed. For example, whereas an attraction is executed in the current game if a watermelon is internally won and the random number for attraction selection is 15, an attraction will not be executed even if the random number for attraction selection is 15 if the internal winning pattern is SB.

FIG. 19B is a diagram showing the attraction category selection table. When the execution of an announcement attraction is determined by the announcement attraction generation table, the attraction category selection table is referenced to determine the contents of the attraction. Attractions are categorized according to how precisely the bell symbol stop positions on the image display device 21 are to be matched to the bell symbol stop positions of reels 24L, 24C, and 24R, and the higher the degree of matching, the higher the probability that a bonus winning combination is an internal winning pattern. For example, in the Figure, "All" in the "number of bells displayed" column indicates that all of the display positions of both parts are matched and "Number appearing—2" indicates that a maximum of two of the display positions of both parts are unmatched. For example, if in the current game, the internal winning pattern is "SB" and the random number for attraction selection is 118, the attraction corresponding to "Number appearing—4" is selected. In this case, if, for example, there are only two bell symbols that are displayed in the stopped state on reels 24L, 24C, and 24R, an attraction mode with which all display positions are unmatched is selected, and if, for example, five bell symbols are displayed, display is performed with four of the display positions being unmatched and one display position being matched.

Figure 18A:
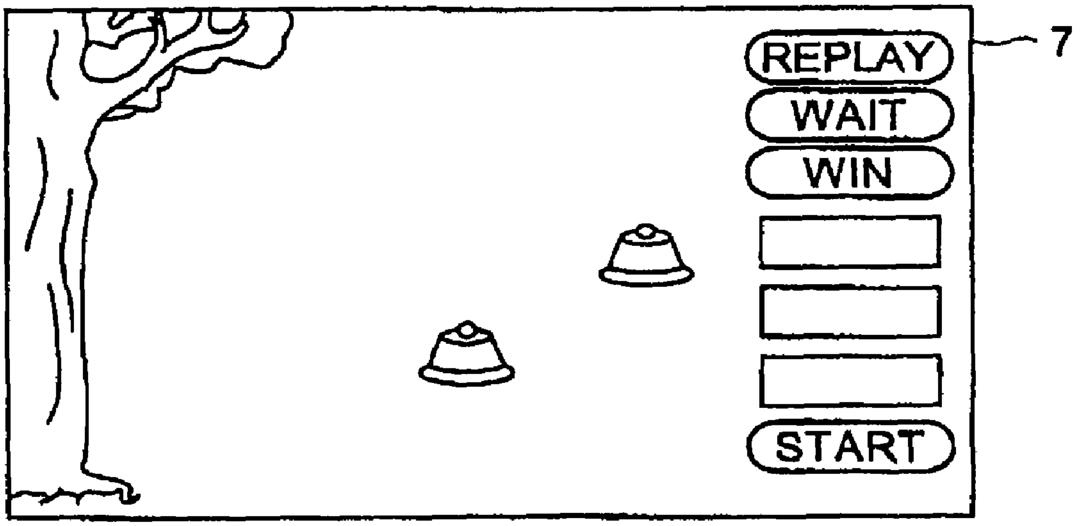
FIG. 18A shows the panel display device when the reels are stopped in a mode during the attraction preview.
Figure 18B:
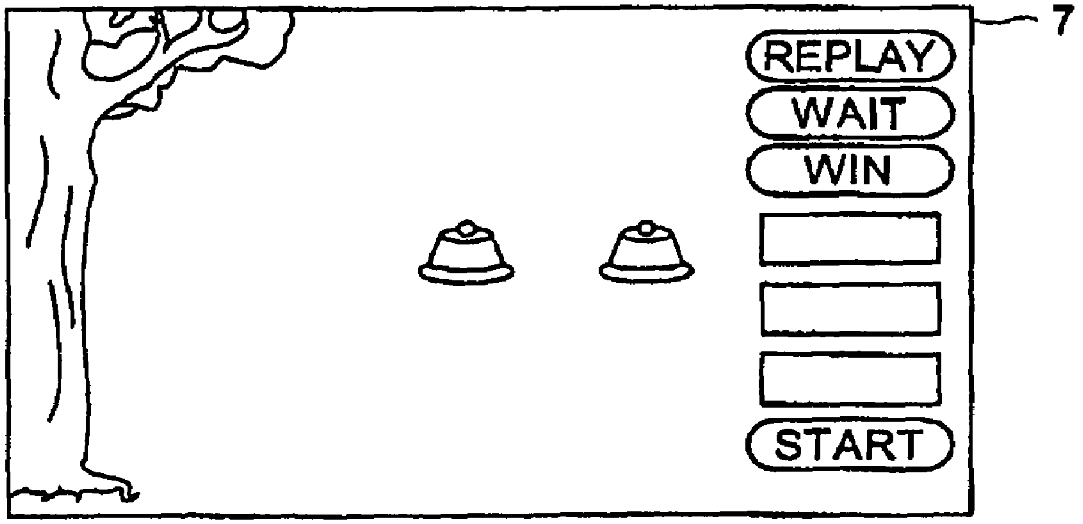
FIG. 18B shows the panel display device when the reels are stopped in another mode during the attraction preview.

FIGS. 18A and 18B show diagrams of specific examples of announcement attraction modes. FIG. 18A shows the display that is displayed when, in the case where reels 24L, 24C, and 24R are stopped in the display mode of FIG. 17B, any of "Number appearing—2," "Number appearing—3," "Number appearing—4," and "Number appearing—5," is selected from the attraction category selection table of FIG. 19B. Though with regard to the symbols displayed on the reels in the reel stopped state of FIG. 17B, bell symbols are displayed at the middle stage of middle reel 24C and the upper stage of right reel 24R, on the image display device 21, bell symbols are displayed at the lower stage of the middle reel and the middle stage of the right reel, and since the display positions of both parts are not matched, it can be understood that the announcement attraction is one that indicates low reliability.

FIG. 18B shows a display that is displayed when, in the case where reels 24L, 24C, and 24R are stopped in the display mode of FIG. 17B, "Number appearing—1" is selected from the attraction category selection table of FIG. 19B. With regard to the symbols displayed on the reels, bell symbols are displayed at the middle stage of middle reel 24C and the upper stage of right reel 24R, and on the image display device 21, bell symbols are displayed at the middle stage of the middle reel and the middle stage of the right reel. Though the display position is mismatched with regard to right reel 24R, since the display position is matched for middle reel 24C, it can be understood that the announcement attraction is one that indicates high reliability.

FIG. 20 is a diagram showing a BR generation and BR continuing number lottery table. With the present embodiment, whether or not a BR is to be made to occur and the number of times BR is to be continued are determined by lottery at a fixed probability when a predetermined prize pattern is internally won. In this table, a BR is made to occur at a probability of 16/128 when a watermelon is internally won, at a probability of 11/128 when two cherries are internally won, and at a probability of 25/128 in the case of missed winning.

Figure 21:
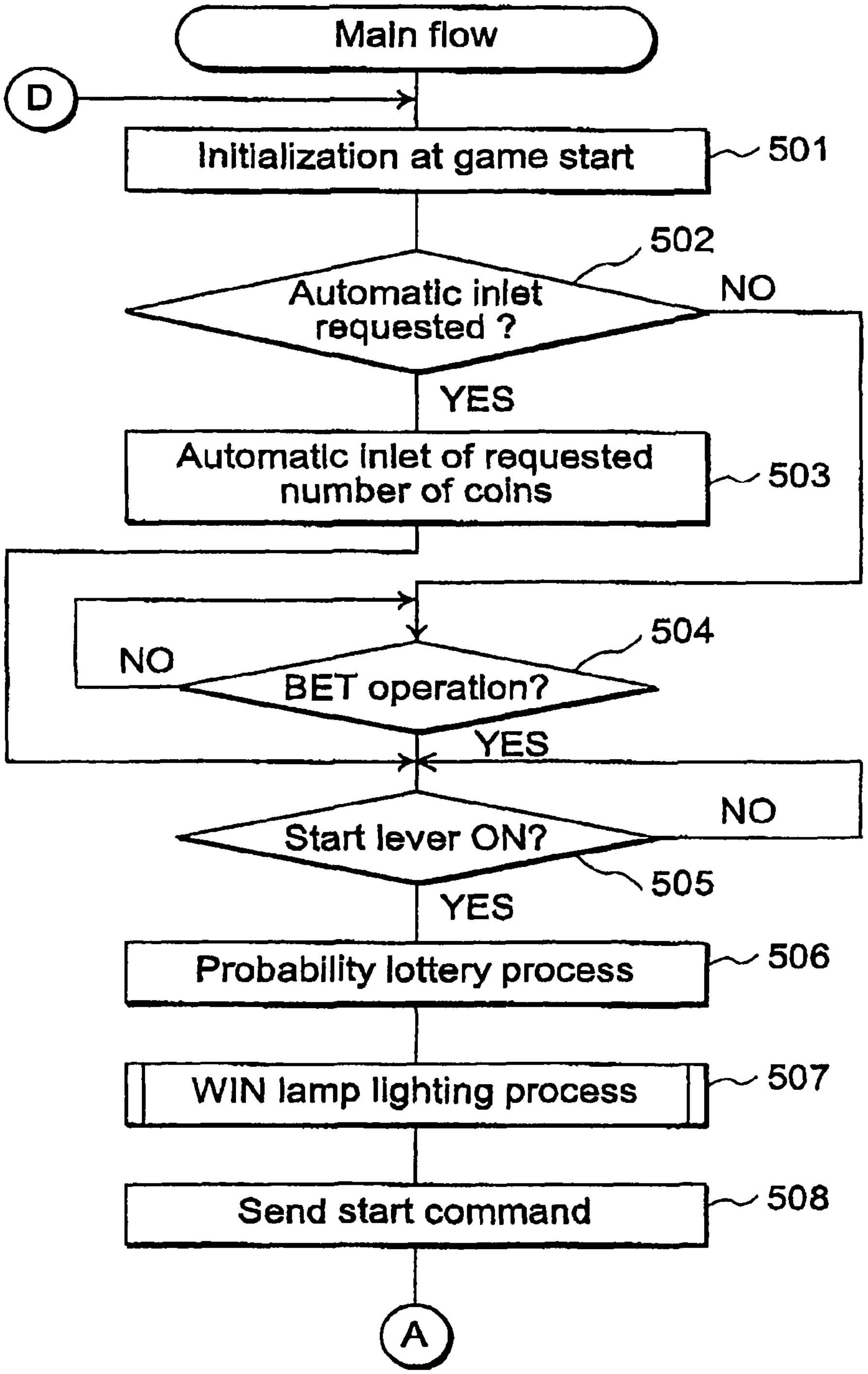
FIG. 21 is a flowchart showing a process of the main control circuit.
Figure 22:
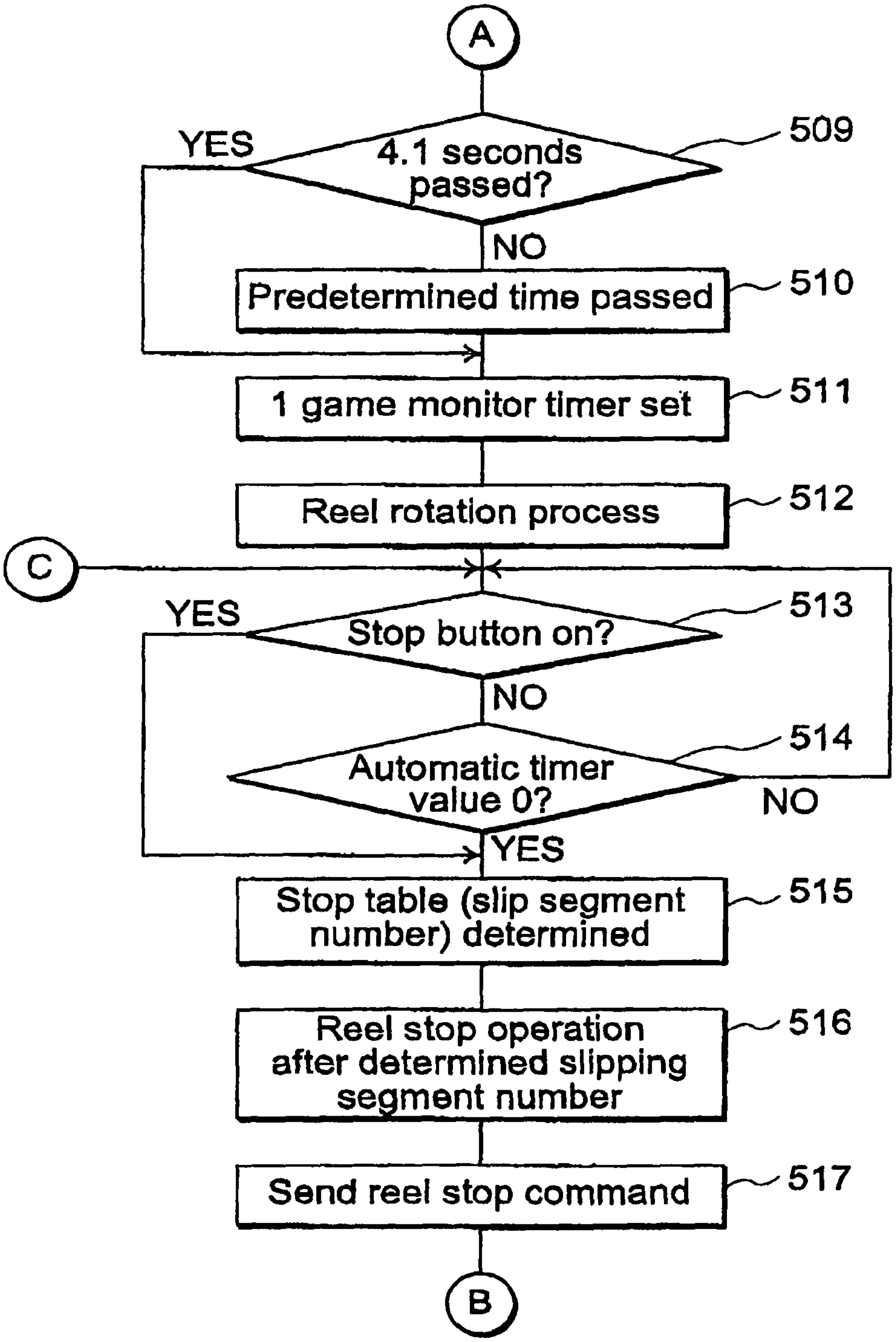
FIG. 22 is a flowchart showing a process of the main control circuit.
Figure 23:
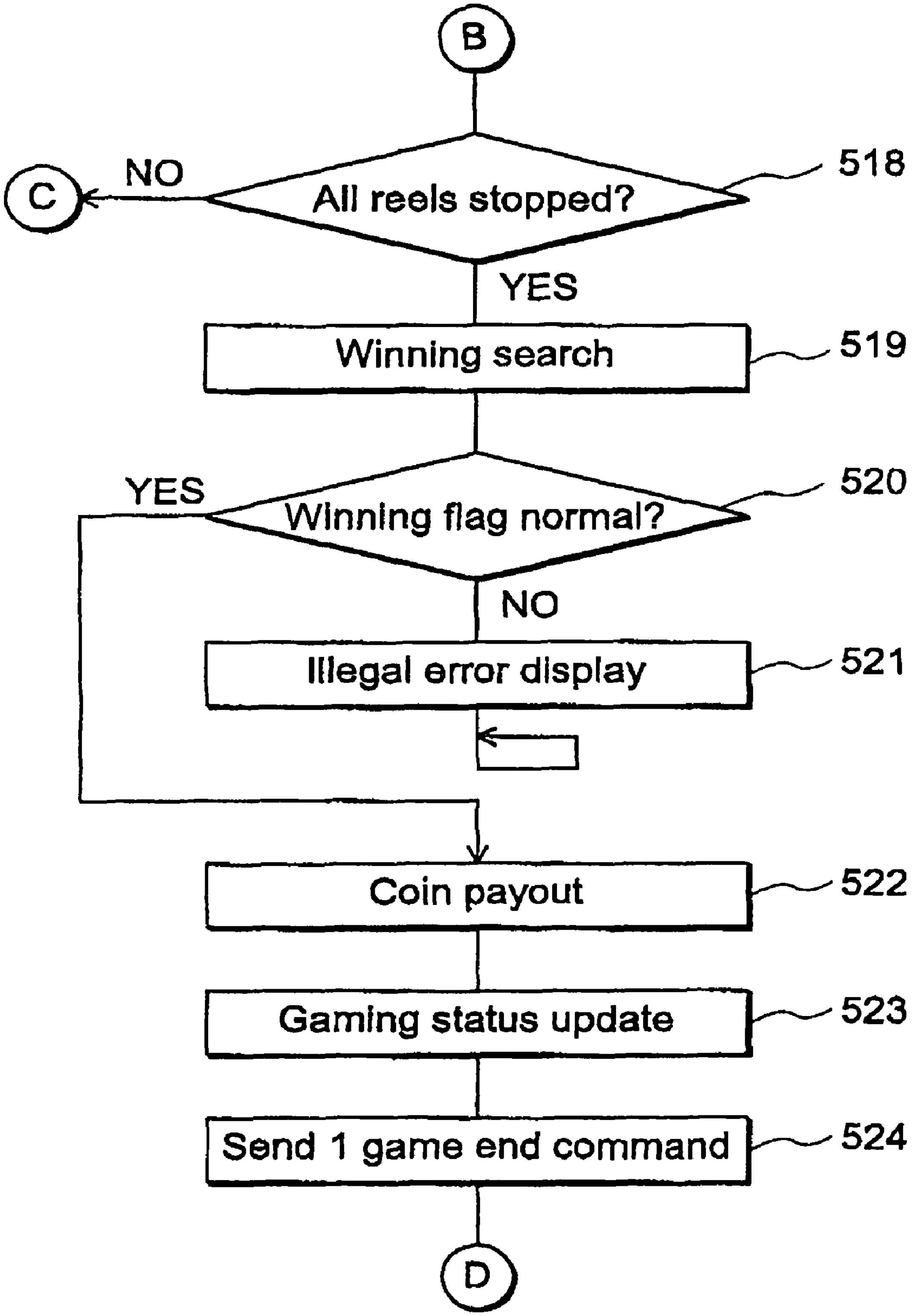
FIG. 23 is a flowchart showing a process of the main control circuit.

The control operations of main control circuit 101 and CPU 103 will now be explained with reference to the main flowchart shown in FIG. 21 through FIG. 23.

First, CPU 103 carries out an initialization process before starting a game (step 501, referred to as ST hereinafter). Specifically, the previous game status and communication data stored in RAM 105 are cleared, the game parameters required for a game are written, the start address of the sequence program is set, etc.

CPU 103 then determines whether or not there is an automatic coin inlet request, in other words, determines whether there was a replay prize in the previous game (ST 502). If determined as "YES," the requested number of coins are loaded automatically (ST 503) and a transfer to the process of ST 505 is carried out. If determined as "NO" at ST 302, whether or not new coins were inserted, in other words, whether or not there is an input from the inlet coin sensor 117 due to coins being loaded into coin inlet 11 by a player and whether or not there is an input by the operation of any of the various BET switches 8, 9, and 10 are determined (ST 504). If determined as "YES," a transfer to ST 305 is performed while if determined as "NO," the input signal is monitored until a BET operation is executed.

CPU 103 then determines whether or not there is an input due to the operation of start lever 13 (ST 505). If determined as "YES," a transfer to ST 506 is performed, and if determined as "NO," the input signals are monitored until the start lever is operated.

Next, the probability lottery process is carried out (ST 506). In the probability lottery process, first, a random number for lottery is picked up from the range of "0 to 16383" using random number generator 108 and sampling circuit 109. Then using the prize probability table (FIG. 11) that sets a random number range (prize range) in accordance with the gaming state and number of medals input, the prize range to which the picked-up random number belongs is determined and the corresponding internal winning pattern (winning flag) is determined.

Next, if a bonus winning combination was won internally, a WIN lamp lighting process of lighting up the WIN lamp at a predetermined probability is performed (ST 507).

The game information of main control circuit 101 at the start of the game is then sent to the sub-control circuit (ST 508). For a transmitted command, such as the "start command" among the game information commands in FIGS. 12A, 12B, and 12C, the winning flag determined by the above-mentioned probability lottery process, the current gaming state, the stop table number determined according to the winning flag, etc., are sent.

Next, it is determined, whether or not a predetermined time, for example 4.1 sec, has passed since the one game monitoring timer was set in the previous game (ST 509). If determined as "YES," the one game monitoring timer for the following game is set (ST 511). If determined as "NO," the elapse of the remainder of the predetermined time is awaited (ST 510) and then the one game monitoring timer is set for the following game (ST 511).

Next, CPU 103 controls motor driving circuit 111 and carries out a process of rotating reels 24L, 24C, and 24R (reel rotation process) (ST 512). In the reel rotation process, an acceleration process is carried out starting from the state where the reels 24L, 24C, and 24R are stopped and a constant-speed rotation process is carried out after a predetermined speed is reached. Under this constant-speed rotation state, the stop buttons 15L, 15C, and 15R are activated to enable stop operation of the reels 24L, 24C, and 24R.

Next, CPU 103 determines whether any of stop buttons 15L, 15C, and 15R was operated (whether or not a stop button is on), in other words, whether or not a stop signal has been sent from reel stop signals circuit 118 upon operation of any of the stop buttons 15L, 15C, and 15R by a player (ST 513). If determined as "YES,", a transfer to ST 515 is performed while if determined. As "NO," a transfer to the process of ST 514 is performed. In the process of ST 514, whether or not the value of the automatic stop timer is "0" is determined. "Automatic stop" refers to a process in which the reels 24L, 24C, and 24R are stopped automatically after the elapse of a predetermined period of time (for example, 40 seconds) from the point at which the reels started rotating even if stop buttons 15L, 15C, and 15R have not been pushed and the reels are rotating. If determined as "YES," in other words, if the value of the automatic stop timer is "0," a transfer to ST 515 is performed in order to automatically stop the reels, and if determined as "NO," a transfer to the process of ST 513 is carried out in order to continue monitoring the reception of stop operations.

In the process of ST 515, CPU 103 carries out a "slip segment number determination process." In the "slip segment number determination process," the slip segment number of the reel corresponding to the stop button that was subject to a stop operation is determined. Here, "slip segment number" refers to the number of symbols (number of segments) to be slipped before stopping the reel (the actual stop position is called "stop position") from the symbol position (referred to as the "stop operation position") that is displayed in display window 43L, 43C, or 43R when stop button 15L, 15C, or 15R is pushed.

Next, the CPU 103 controls motor driving circuit 111 so that the reel corresponding to the stop button that was subject to a stop operation is stopped after rotating by the determined number of slip segments (ST 516).

Next, the CPU 103 transmits to the sub-control circuit 201 a "reel stop command," which indicates that the reel has been stopped (ST 517). As indicated in the "reel stop command" of the game information command, the reel stop command transmits the stop order status (the number of the current stop operation) and the stop reel status (the reel subject to the stop operation) to the sub-control circuit 201.

Next, the CPU 103 determines whether or not all reels have stopped. If determined as "YES," a transfer to ST 519 is carried out. If determined as "NO," since this means that there remain some rotating reels, a transfer to ST 513 is carried out.

Next, CPU 103 carries out a winning search process (ST 519). In this winning search process, it is determined whether not the mode of stoppage of the symbols displayed in display windows 43L, 43C, and 43R denotes an established winning. If this stop mode denotes an established winning, the winning flag of the corresponding winning pattern is stored in RAM 105. Specifically, the determination is made by collating the code numbers of the symbols on center line L1 with the winning symbol combination table stored in ROM 104.

The prize flag and the winning flag are then compared to see whether or not they match and thereby determine whether or not the current win is normal (ST 520). If determined as "NO," an "illegal error" is displayed and the execution of the game program is interrupted. If determined as "YES" in ST 520, coins are paid out in accordance with the established winning pattern type and gaming state (ST 522).

If the gaming state is changed by completing the current game, a transition process is carried out (ST 523). This process is carried out, for example, when the final winning in the bonus game has been achieved, when a bonus is internally won in the current game, or when the symbols "7-7-7" stop on the active line and the bonus game is started.

Next, the category of the established winning pattern, the gaming state, etc., are sent to the sub-control circuit in the form of a "1 game completion command" as shown in the game information command tables of FIGS. 12A-12C (ST 524).

The control operation of sub-CPU 203 of sub-control circuit 201 will now be described.

Figure 24:
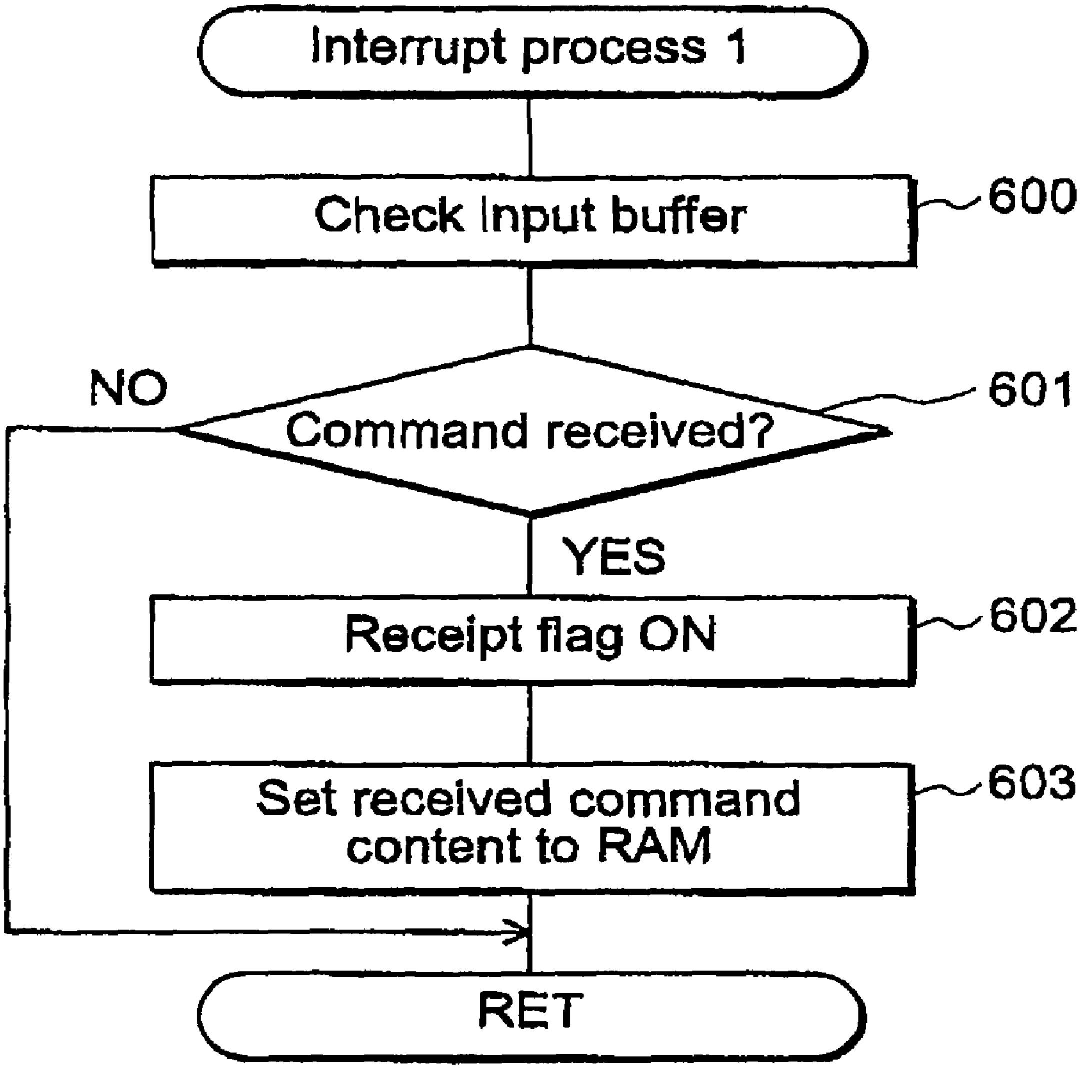
FIG. 24 is a flowchart showing an "interrupt process 1."

FIG. 24 shows a flowchart of an interrupt process 1. This interrupt process 1 is executed as an interrupt process every 3 ms, and in this process, the game information commands sent from main control circuit 101 and input signals from the touch panel are stored in sub-RAM 205.

First, sub-CPU 203 checks the input buffer (ST 600) and determines whether or not there is an input signal in the input buffer (ST 601). If determined as "YES," a receiving flag is turned on (ST 602), the contents of the received command are set in sub-RAM 205 (ST 603), and the process is completed. If determined as "NO,", the process is completed as it is.

Figure 25:
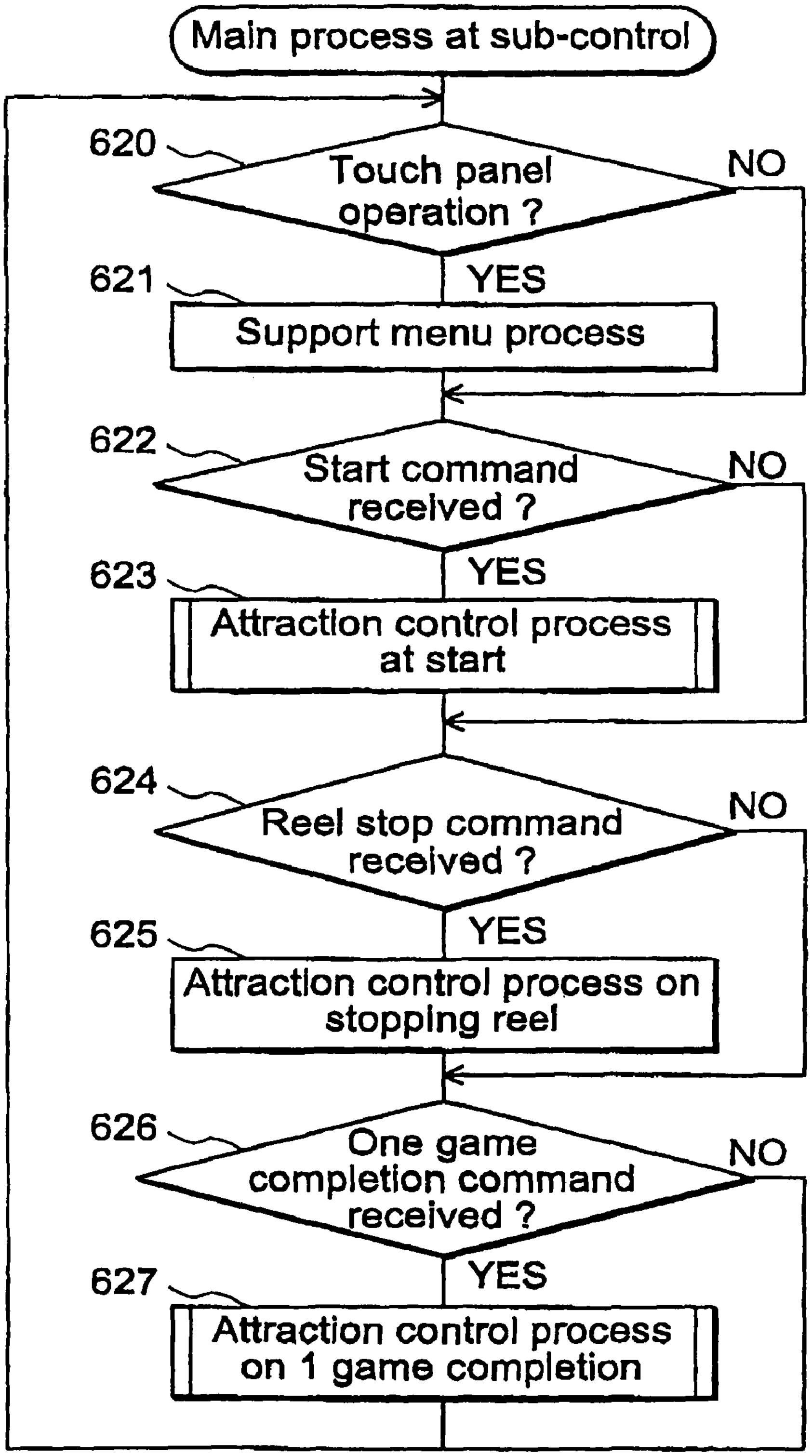
FIG. 25 is a flowchart showing a sub-side main flow.

FIG. 25 shows a flowchart of the main process at the sub-control circuit side. First sub-CPU 203 checks the receiving flag of sub-RAM 205 and determines whether or not there has been an operation input from the touch panel (ST 620). If determined as "YES," a support menu process is executed (ST 621) and a transfer to ST 622 is performed. If determined as "NO," ST 621 is skipped and a transfer to ST 622 is performed. In the support menu process, display and editing of the support menu are carried out in accordance with inputs.

Next, whether or not the start command has been received is determined (ST 622), and if determined as "NO," ST 623 is skipped and a transfer to ST 624 is performed. If determined as "YES," an attraction control process for starting is executed (ST 622). With the attraction control process for starting, the BR control process is carried out if the current state is the BR state. Details will be given below.

Next, whether or not the reel stop command has been received is determined (ST 624), and if determined as "NO," ST 625 is skipped and a transfer to ST 626 is performed. If determined as "YES," an attraction control process for reel stopping is executed (ST 625). With the attraction control process for reel stopping, the BR generation lottery process, notification of the order of stopping in the BR state, and attractions, which are in accordance with matching of the notified contents and the actual stopping operations, are carried out. Details will be given below.

Next, whether or not the 1 game completion command has been received is determined (ST 626), and if determined as "NO," ST 627 is skipped, a return to the process of ST 620 is performed, and the same processes are repeated. If determined as "YES," an attraction control process for the completion of one game is executed (ST 627). With the attraction control process for the completion of one game, an announcement attraction process, or if the current state is the BR state, the process of renewing the number of times of continuation of BR is executed. Details will be given below.

When the process of ST 627 is completed, a return to ST 620 is performed and the same processes are repeated. Thus with the main flowchart of sub-control circuit 201, processes of branching to corresponding attraction processes are carried out repeatedly based on game information commands sent from main control circuit 101.

Figure 26:
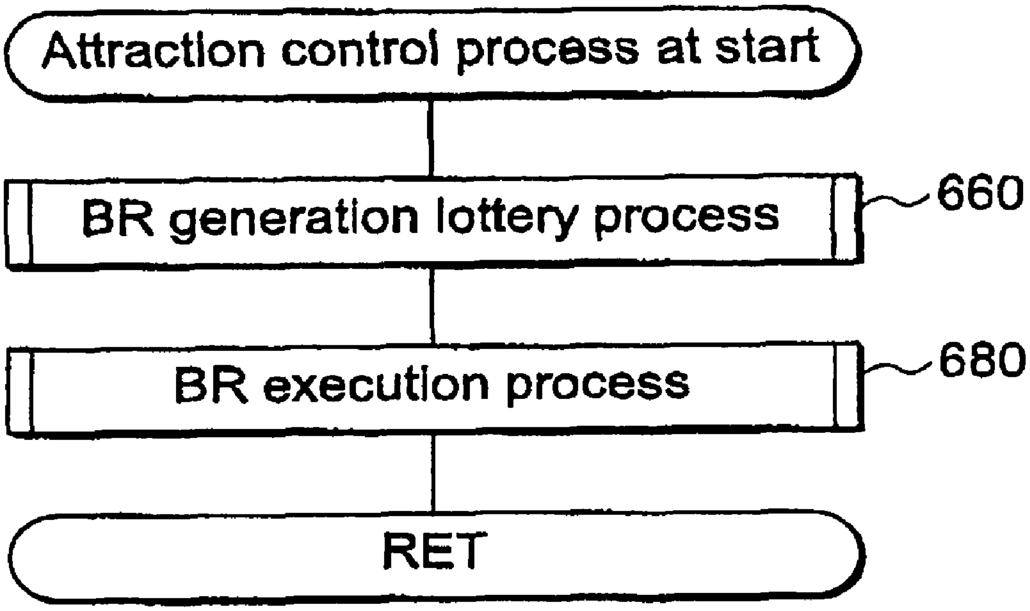
FIG. 26 is a flowchart showing an attraction control process that is executed at the starting point.

FIG. 26 shows a flowchart of the attraction control process for starting. First, sub-CPU 203 carries out a BR generation lottery process (ST 660). The BR generation lottery process is a process that determines whether or not battle rush, which is a special gaming state, is to be made to occur. Details will be given below. A BR execution process is then carried out (ST 680). With the BR execution process, notification of the stopping order is carried out in the BR state. Details will be given below.

Figure 27:
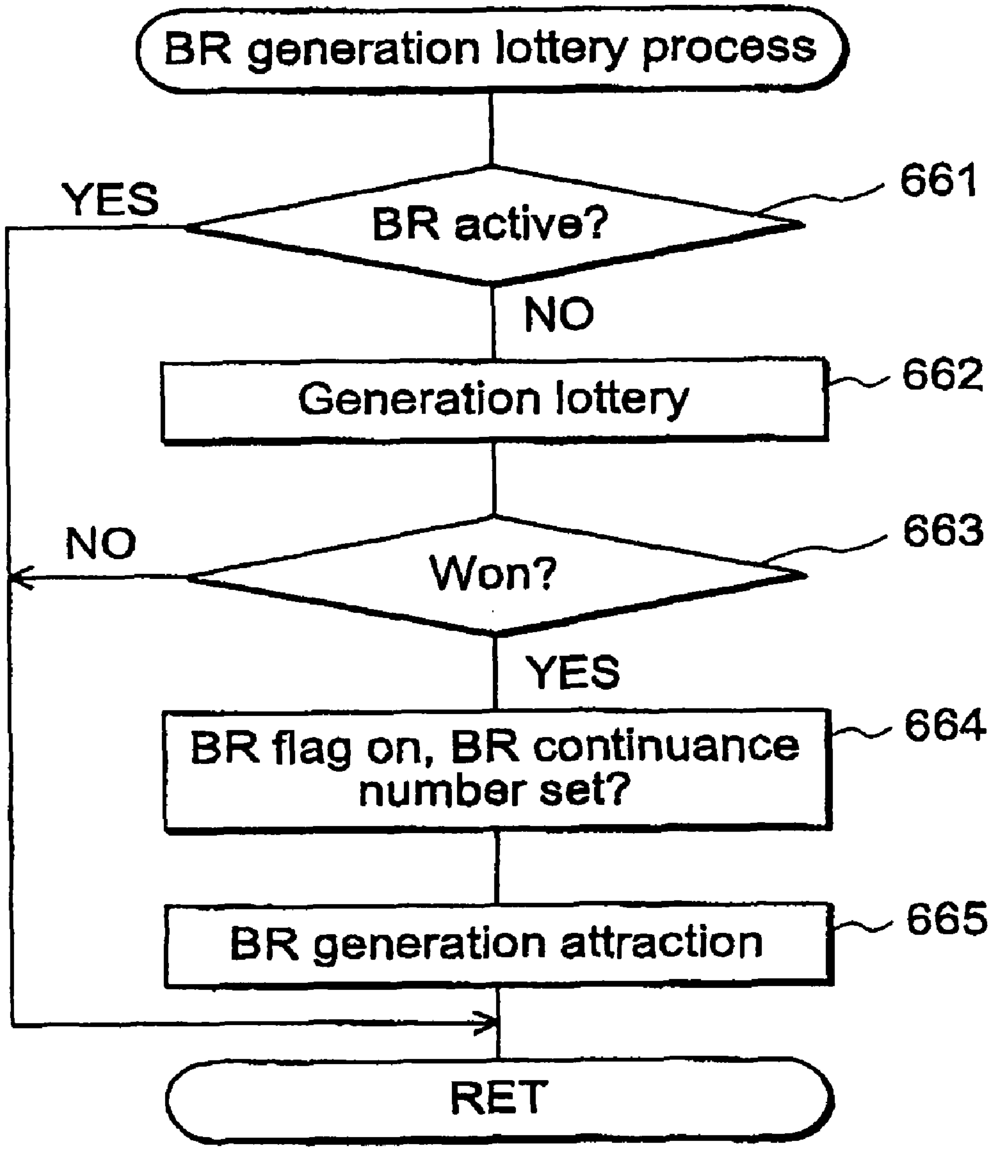
FIG. 27 is a flowchart showing a BR generation lottery process.

FIG. 27 shows a flowchart of the BR generation lottery process. First, sub-CPU 203 checks a BR flag stored in sub-RAM 205 to determine whether or not BR game is currently in progress (ST 661). If determined as "YES," a return to the attraction control process for starting is performed as it is. If determined as "NO," the BR generation and BR continuing number lottery table of FIG. 20 is referenced and whether or not a BR continuance number has been won is determined (ST 662, 663). If determined as "NO," a return to the attraction control process for starting is performed. If determined as "YES," the BR flag in sub-RM 205 is set to on, the BR continuance number is set to the continuance number that has been won (ST 664), a BR generation attraction is carried out (ST 665), and a return to the attraction control process for starting is performed.

Figure 28:
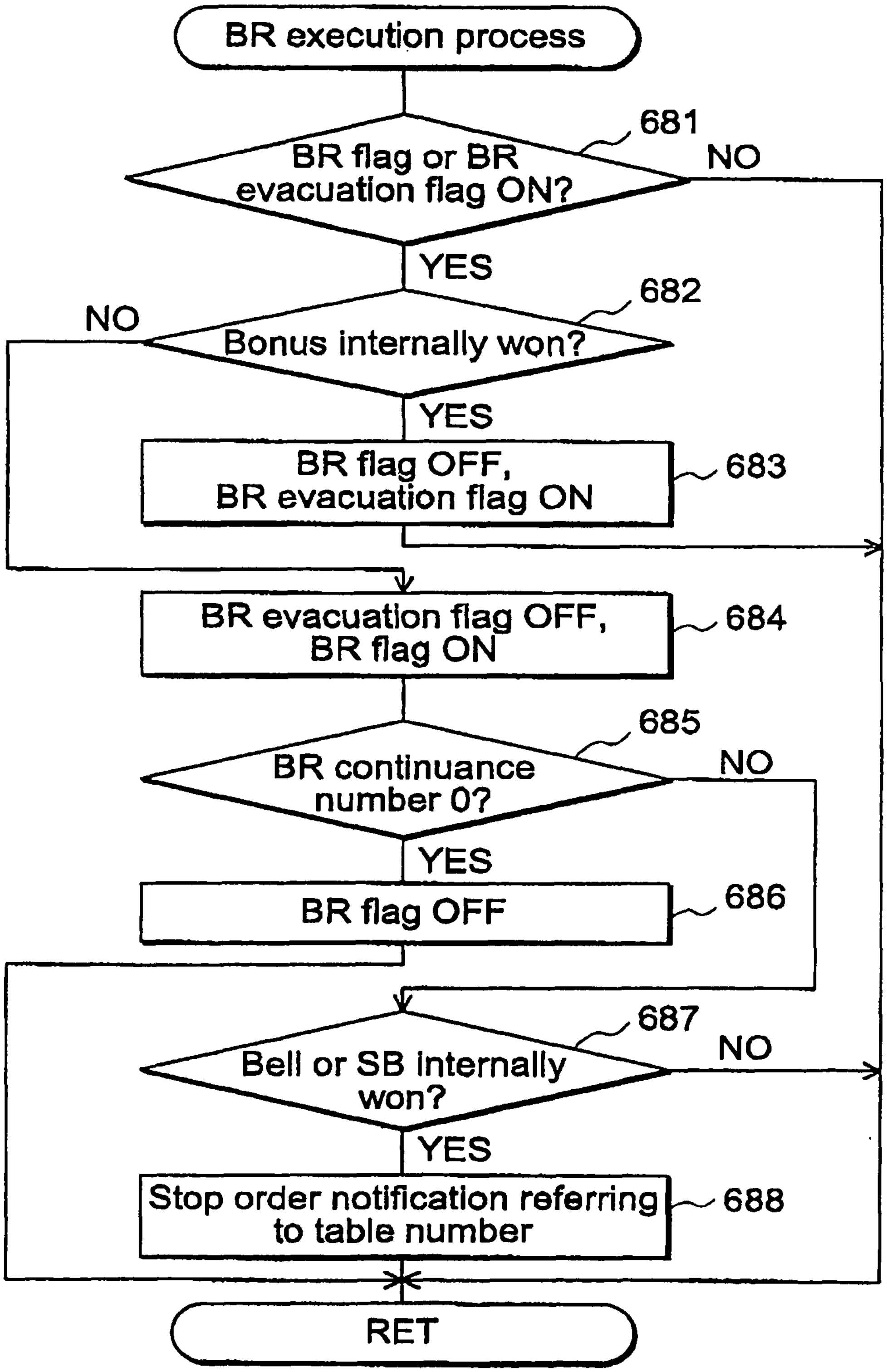
FIG. 28 is a flowchart showing a BR execution process.

FIG. 28 shows a flowchart of the BR execution process. First, sub-CPU 203 checks the BR flag and a BR evacuation flag in sub-RAM 205 to determine whether or not BR game is currently in progress or a bonus has been generated during BR and the BR gaming state is temporarily interrupted (ST 681). If determined as "NO," since this means that the present state is not the BR state, a return to the attraction control process for starting is performed as it is. If determined as "YES," the receiving flag in sub-RAM 205 is checked to determine whether or not a bonus winning combination has been won internally (ST 682), and if determined as "YES," the BR is interrupted, the BR flag in sub-RAM 205 is set to off and the BR evacuation flag is set to on in order to finish up the bonus game (ST 683), and a return to the attraction control process for starting is performed.

If determined as "NO" in ST 682, then in order to restart BR from the state in which BR is evacuated, the BR evacuation flag in sub-RAM 205 is set to off and the BR flag is set to on (ST 684). The BR continuance number in sub-RAM 205 is then checked to check whether all of the BR continuance number of times of game have been finished and determine whether or not the continuance number has become 0 (ST 685). If determined as "YES," since this means that BR has ended, the BR flag is set to off (ST 686) and a return to the attraction control process for starting is performed.

If determined as "NO," since this means that the defined number of times of BR game have not been finished, the receiving flag in sub-RAM 205 is checked to determine whether or not the bell or SB has been won internally in the present game (ST 687). If determined as "YES," the selected stop table category, stored in the receiving flag in sub-RAM 205, is referenced and the appropriate order of stopping is notified (ST 688) and a return to the attraction control process for starting is performed. If determined as "NO," a return to the attraction control process for starting is performed without notifying anything.

Figure 29:
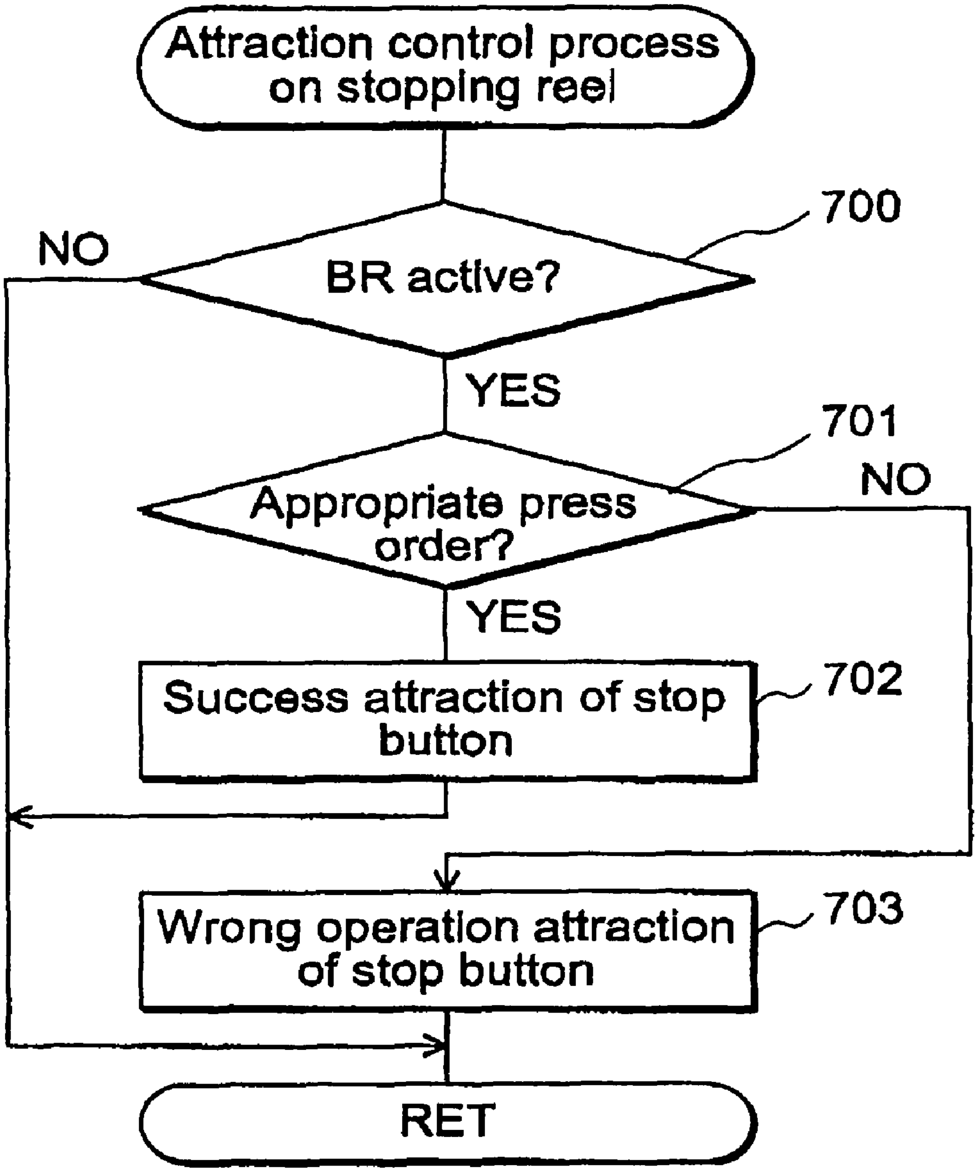
FIG. 29 is a flowchart showing an attraction control process that is executed when a reel is stopped.

The attraction control process that is carried out when any of the stop buttons 15L, 15C, and 15R is pressed in the BR state will now be described. FIG. 29 shows a flowchart for the attraction control process for reel stopping. First, sub-CPU 203 checks the BR flag in sub-RAM 205 to determine whether or not the current state is the BR state (ST 700), and if determined as "NO," a return to the main process at the sub side is performed as it is. If determined as "YES," the stop command of the receiving flag in sub-RAM 205 is checked and the stopping order data and stopped reel data are compared with the used table No. data to determine whether or not the current stopping operation has been performed in the correct order of pushing switches as designated by the stop table (ST 701). If determined as "YES," that the stopping operation was performed in the correct order of pushing switches is displayed (ST 702), while if determined as "NO," that the stopping operation was performed in the wrong order of pushing switches is displayed (ST 703). A return to the main flow for the sub side is then performed.

Figure 30:
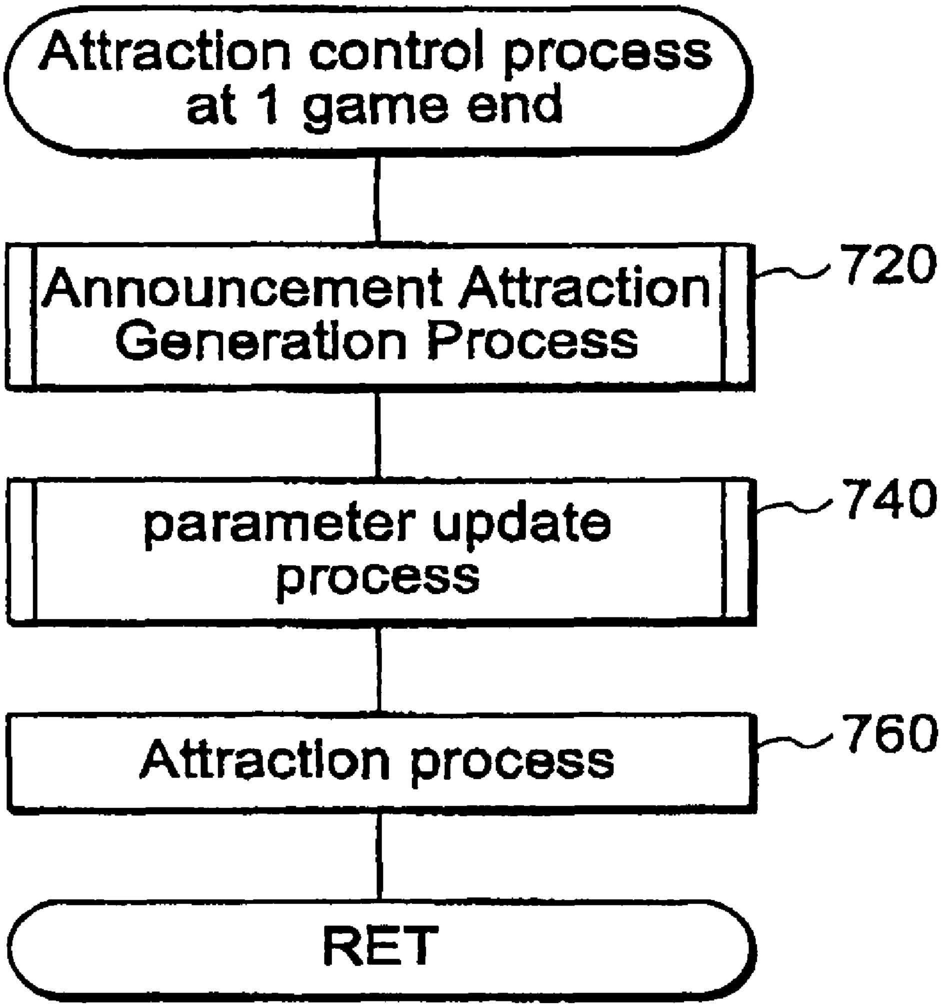
FIG. 30 is a flowchart showing an attraction control process that is executed when one game ends.

The attraction control process that is carried out after all reels have stopped will now be described. FIG. 30 shows a flowchart for the attraction control process for the completion of one game. First, sub-CPU 203 executes an announcement attraction generation process of determining whether or not an announcement attraction for an internal winning pattern is to be generated (ST 720). Next, a parameter renewal process of renewing the relevant parameters is executed (ST 740) if the current gaming state is the BR state. Then, the attraction process is executed (ST 760) if the generation of the announcement attraction has been determined in the announcement attraction generation process. A return to the main flow for the sub side is then performed.

Figure 31:
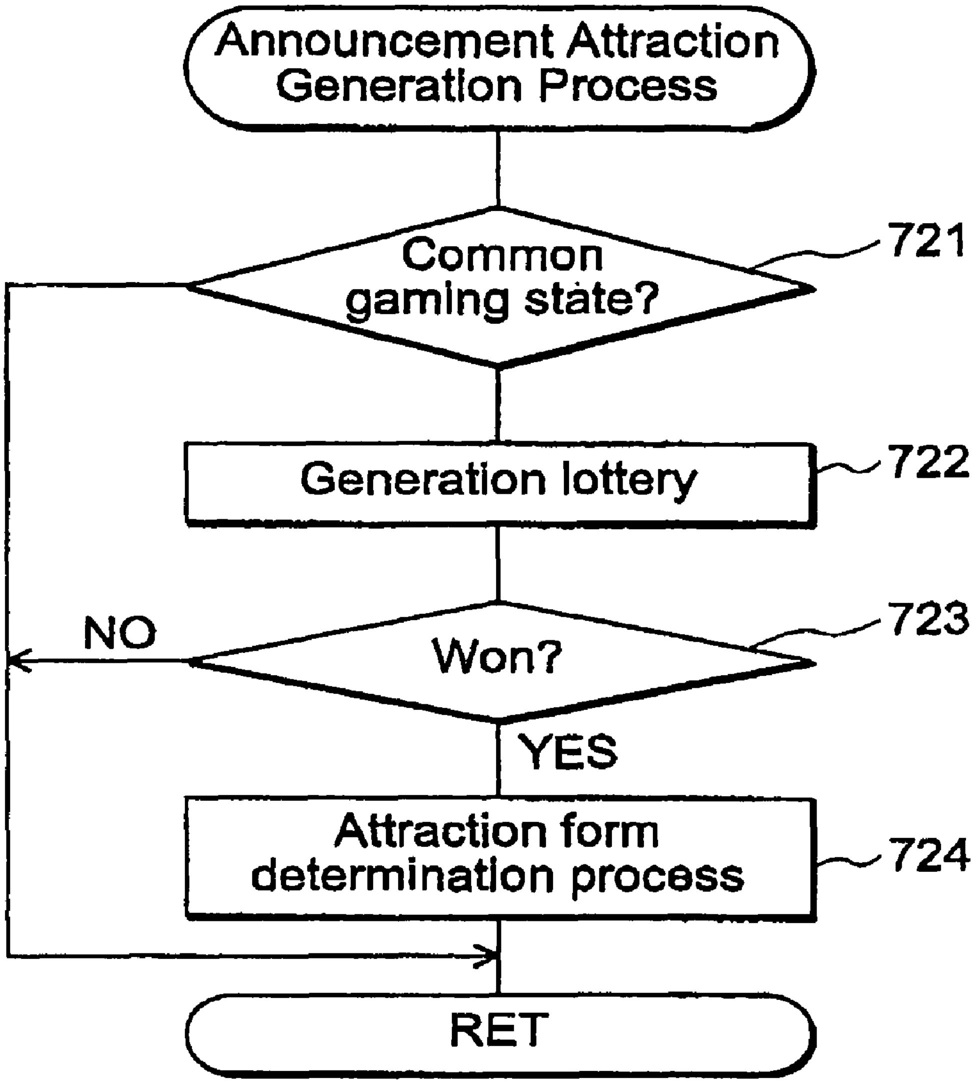
FIG. 31 is a flowchart showing an announcement generation process.

FIG. 31 shows a flowchart of the announcement attraction generation process. First, sub-CPU 203 checks the receiving flag in sub-RAM 205 to determine whether or not the current gaming state is the general gaming state (ST 721), and if determined as "YES," the announcement attraction generation table of FIG. 19A is referenced to execute a lottery for generating an announcement attraction (ST 722), whether or not the lottery is won is determined (ST 723), and if determined as "YES," the attraction category selection table of FIG. 19B is referenced to execute an attraction form determination process to determine the form of the announcement attraction (ST 724) and then a return to the attraction control process for the completion of one game is performed. If determined as "NO," a return to the attraction control process for the completion of one game is performed as it is.

Figure 32:
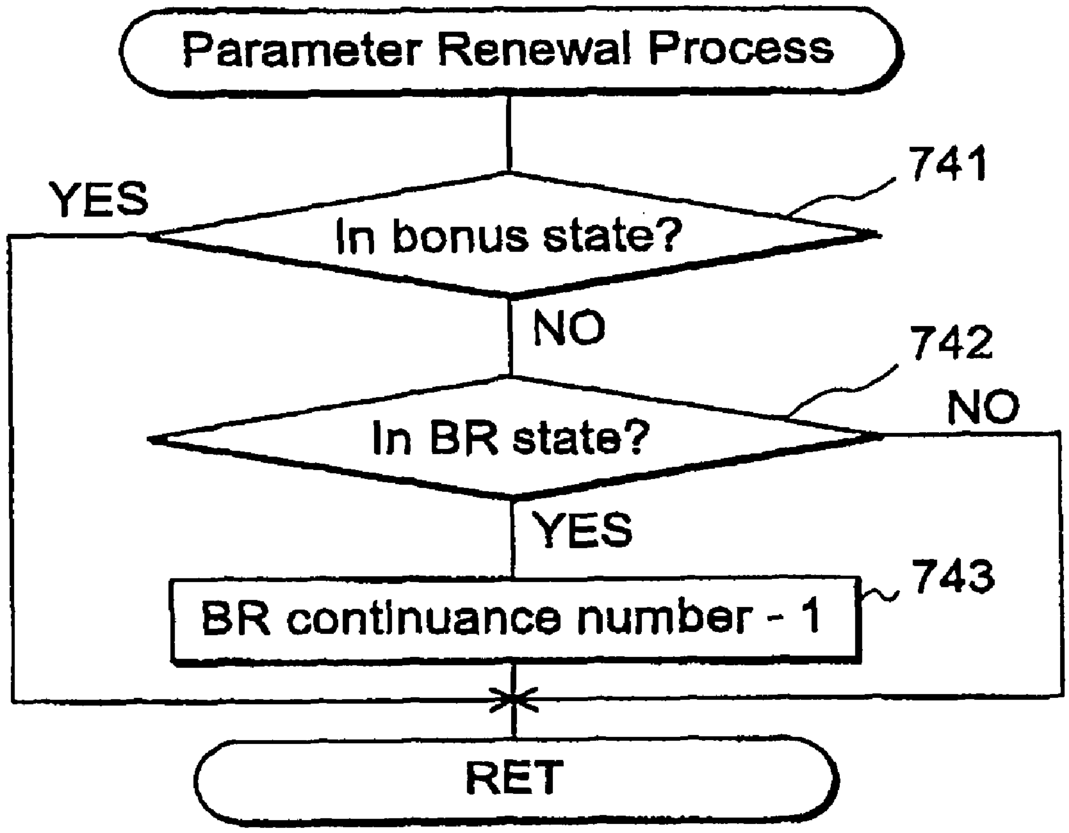
FIG. 32 is a flowchart showing a parameter renewal process.

FIG. 32 shows a flowchart of the parameter renewal process. First, sub-CPU 203 checks the 1 game completion command of the receiving flag stored in sub-RAM 205 to determine whether or not the current gaming state is the bonus game state (ST 741), and if determined as "YES," since the current state cannot be the BR state, a return to the attraction control process for the completion of one game is performed as it is. If determined as "NO," the BR flag stored in sub-RAM 205 is checked to determine whether or not the current state is the BR state (ST 742). If determined as "NO," a return to the attraction control process for the completion of one game is performed as it is. If determined as "YES," the BR continuance number counter in sub-RAM 205 is decremented (ST 743) and then a return to the attraction control process for the completion of one game is performed.

Though the present embodiment is described with the ST period as an advantageous status for the player that is established by achieving the present object, the above-mentioned AT period may be applied instead or as an advantageous status for the player. The winning flag of a specific prize pattern may be established or the internal winning probability of a prize pattern may be increased.

In addition to the slot machine, the pachi-slot machine, or the like, for example, the above-described embodiment, this invention may be applied in a similar manner to a pachinko gaming machine or an arcade gaming machine equipped with an electrical display device or to a home video game that executes the above-described functions in a simulating manner with a software.

By this invention, since just a display area, which is to be displayed in an enhancing manner to a player in accordance with the game conditions, can be displayed while shielding the other display areas, information can be transmitted infallibly to the player without being affected by the position of installation of the display device, brightness of a lamp, etc. Also, when stopping operations are to be performed during the Super Time (ST) gaming state, the present invention enables the Super Time (ST) gaming state to be completed without movement of the sight line from the image display device, on which the stopping order is displayed, to the reels, thus alleviating the degree of fatigue of the player. Furthermore, switching between the transmitting and shielding states can be performed instantaneously in accordance with the game conditions, and since the shielded areas can be controlled by software, finer attraction control is enabled.

What is claimed is:

1. A gaming machine, comprising:

a plurality of variable display means for varyingly displaying a plurality of symbols in order to form prize patterns constituted of a predetermined number of symbols;

a lottery means for executing a lottery of the prize patterns;

a stop control means for controlling the variable display means to stop varying the plurality of symbols;

a stop control selection means for selecting a type of control of the stop control means to determine an order in which the plurality of variable display means are stopped by referencing a result of the lottery; and a display device, including:

a substantially transparent panel, an image display device for displaying an image, the image display device being provided behind the panel, so as to show an image visibly through the panel, and a shutter being disposed in front of the variable display means and behind the image display device to block symbols of the variable display means from viewing, and a shutter control means for controlling the shutter according to the type of control selected by the stop control selection means, wherein the shutter control means:

(a) varyingly displays only a first of the variable display means which stops first, and blocks, by the shutter, symbols other than the symbol constituting a prize pattern from the prize patterns on the first-stopped variable display means when there is a symbol constituting the prize pattern when the first-stopped variable display means stops;

(b) as a result (a), varyingly displays a second of the variable display means which stops second, and blocks, by the shutter, symbols other than the symbol constituting the prize pattern on the second variable display means when there is a symbol constituting the prize pattern when the second variable display means stops;

(c) as a result of (b), varyingly displays a last of the variable display means which stops last, and blocks, by the shutter, symbols other than the symbol constituting the prize pattern on the last variable display means when the last variable display means stops; and (d) after all of the variable display means have stopped and after a fixed period of time has elapsed, performs transparency control of the shutter to reveal the stopped variable display means, wherein the image display device displays the existence of the prize pattern corresponding to the symbols blocked by the shutter by way of predetermined characters such that the characters overlap a symbol not blocked by the shutter.

2. The gaming machine according to claim 1, wherein the shutter comprises an electronic shutter.

3. The gaming machine according to claim 1, wherein the shutter is formed in a substantially flat shape; and the shutter comprises at least a substantially transparent portion such that a portion of a symbol behind the shutter is not blocked by the shutter.

4. The gaming machine according to claim 1, wherein the image display device comprises a liquid crystal display.

5. The gaming machine according to claim 1, the gaming machine comprising a light being disposed behind the shutter such that the symbol is illuminated.

6. The gaming machine according to claim 1, wherein the variable display device comprises a reel; and wherein the reel has a plurality of symbols on an outer peripheral surface thereof.

7. The gaming machine according to claim 1, further comprising:

special game control means for causing a special gaming state that is advantageous to the player under a predetermined condition, wherein the shutter control means controls the shutter during the special gaming state.

8. The gaming machine according to claim 1, wherein the panel, based on the result of the lottery of the lottery means, displays the existence of the prize pattern corresponding to at least a portion of the symbol blocked by the shutter so as to be superimposed with the symbols that are in a transparent state.

* * * * *